US006868411B2

(12) United States Patent
Shanahan

(10) Patent No.: US 6,868,411 B2
(45) Date of Patent: Mar. 15, 2005

(54) FUZZY TEXT CATEGORIZER

(75) Inventor: James G. Shanahan, Pittsburgh, PA (US)

(73) Assignee: Xerox Corporation, Stamford, CT (US)

( * ) Notice: Subject to any disclaimer, the term of this patent is extended or adjusted under 35 U.S.C. 154(b) by 305 days.

(21) Appl. No.: 09/928,619

(22) Filed: Aug. 13, 2001

(65) Prior Publication Data

US 2003/0078899 A1 Apr. 24, 2003

(51) Int. Cl.[7] .............................. G06F 9/44; G06N 7/02; G06N 7/06

(52) U.S. Cl. ............................... 706/52; 706/12; 706/14

(58) Field of Search ............................... 706/52, 12, 14

(56) References Cited

U.S. PATENT DOCUMENTS

| 5,835,901 A | * | 11/1998 | Duvoisin et al. | ............. 706/19 |
| 6,483,938 B1 | * | 11/2002 | Hennessey et al. | ......... 382/149 |
| 6,625,585 B1 | * | 9/2003 | MacCuish et al. | ............. 706/10 |
| 2002/0065845 A1 | * | 5/2002 | Naito et al. | .............. 707/500.1 |
| 2003/0046253 A1 | * | 3/2003 | Shetty et al. | .................. 706/1 |

FOREIGN PATENT DOCUMENTS

WO    WO 99/67728    12/1999

OTHER PUBLICATIONS

Baldwin, J.F., J. Lawry, and T.P. Martin. "Mass assignment fuzzy ID3 with applications", in Fuzzy Logic: Applications and Future Directions Workshop. London, UK. pp. 278–294. 1997.
Baldwin, J.F., T.P. Martin, and B.W. Pilsworth, "FRIL—Fuzzy and Evidential Reasoning", in A.I. 1995: Research Studies Press (Wiley Inc.), pp. 185–202.
Baldwin, J.F., "Fuzzy and Probabilistic Uncertainties", in Encyclopaedia of AI, 2nd ed., Shapiro, Editor. 1995. pp. 528–537. 1992.
Baldwin, J.F., T.P. Martin, and J.G. Shanahan. "Modelling with words using Cartesian granule features", FUZZ–IEEE. Barcelona, Spain. pp. 1295–1300. 1997.
Bezdek, J.C., "A Physical Interpretation of Fuzzy ISO-DATA". IEEE Trans. on System, Man, and Cybernetics, 1976. 6(5): pp. 387–390.
Bordogna, G. and G. Pasi, "Modeling Vagueness in Information Retrieval", Lectures in Information Retrieval, M. Agosti, F. Crestani, and G. Pasi, Editors. 2000, Springer Verlag: Berlin. p. 207–241, 2000.
Bordogna, et al., "A Linguistic Modeling Of Consensus In Group Decision Making Based On OWA Operators", IEEE Transactions on Systems, Man and Cybernetics 27, pp. 126–132. 1997.
Cristianini, N. and J. Shawe–Taylor, "An introduction to Support Vector Machines", 2000, Cambridge, UK: Cambridge University Press. pp. 26–27 and 44–45.
Deerwester, Dumais, Furnas , Landauer, and Harshman, "Indexing By Latent Semantic Analysis" Journal of the American Society for Information Science, 41(6), 391–407, 1990.

(List continued on next page.)

*Primary Examiner*—Anthony Knight
*Assistant Examiner*—Joseph P. Hirl

(57) ABSTRACT

A text categorizer classifies a text object into one or more classes. The text categorizer includes a pre-processing module, a knowledge base, and an approximate reasoning module. The pre-processing module performs feature extraction, feature reduction, and fuzzy set generation to represent an unlabelled text object in terms of one or more fuzzy sets. The approximate reasoning module uses a measured degree of match between the one or more fuzzy set and categories represented by fuzzy rules in the knowledge base to assign labels of those categories that satisfy a selected decision making rule.

26 Claims, 22 Drawing Sheets

OTHER PUBLICATIONS

Dubois, D. and H. Prade, "Unfair coins and necessary measures: towards a possibilistic interpretation of histograms". Fuzzy sets and systems, 1983. 10: pp. 15–20.

Manning and Schutze, "Foundations Of Statistical Natural Language Processing", published in 1999, MIT Press, Cambridge, MA. pp. 81–147.

Porter, M.F., "An algorithm for suffix stripping". Program, 1980. 14(130–137).

Ruspini, E.H., "A New Approach to Clustering". Inform. Control, 1969. 15(1): pp. 22–32.

Salton, G., "Automatic text processing". 1989, Boston: Addison–Wesley. pp. 207–241.

Shanahan, J.G., "Soft computing for knowledge discovery: Introducing Cartesian granule features". First ed. The international series in engineering and computer science. 2000, Boston: Kluwer Academic Publishers. (Chapters 7,8,9,10).

Sugeno, M. and T. Yasukawa, "A Fuzzy Logic Based Approach to Qualitative Modelling". IEEE Trans on Fuzzy Systems, 1993. 1(1): pp. 7–31.

Yang, Y. and X. Liu. "A re–examination of text categorization methods", in Proceedings of SIGIR Conference. 1999.

* cited by examiner

|  | DOES NOT BELONG TO CATEGORY | BELONGS TO CATEGORY |
|---|---|---|
| HAS FEATURE | $(f^+, c^-)$ | $(f^+, c^+)$ |
| DOES NOT HAVE FEATURE | $(f^-, c^-)$ | $(f^-, c^+)$ |

*FIG. 12*

FUZZY TEXT CATEGORIZER

BACKGROUND OF THE INVENTION

The present invention relates generally to method and apparatus for determining whether an object containing textual information belongs to a particular category or categories. In addition, the present invention relates to the construction of a classifier that automatically determines (i.e., learns) appropriate parameters for the classifier.

Text categorization (i.e., classification) concerns the sorting of documents into meaningful groups. When presented with an unclassified document, electronic text categorization categorizes this document into separate groups of documents. Text categorization can be applied to documents that are purely textual, as well as, documents that contain both text and other forms of data such as images.

To categorize a document, the document is transformed into a collection of related text features (e.g., words) and frequency values. The frequency of text features is generally only quantified and not qualified (i.e., linguistically interpretable). In addition, current techniques for categorization such as neural nets and support vector machines use non-intuitive (i.e., black box) methods for classifying textual content in documents. It would therefore be advantageous to provide a text categorizer that qualifies the occurrence of a feature in a document and/or provides an intuitive measure of the manner in which classification occurs.

SUMMARY OF THE INVENTION

In accordance with the invention, there is provided a text categorizer, and method therefor, for categorizing a text object into one or more classes. The text categorizer includes a pre-processing module, a knowledge base, and an approximate reasoning module. The pre-processing module performs feature extraction, feature reduction (if necessary), and fuzzy set generation to represent an unlabelled text object in terms of one or more fuzzy sets. The approximate reasoning module uses a measured degree of match between the one or more fuzzy sets and categories represented by fuzzy rules in the knowledge base to assign labels of those categories that satisfy a selected decision making rule.

In accordance with one aspect of the invention, a text object is classified by: extracting a set of features from the text object; constructing a document class fuzzy set with ones of the set of features extracted from the text object; each of the ones of the features extracted from the text object having a degree of membership in the document class fuzzy set and a plurality of class fuzzy sets of a knowledge base; measuring a degree of match between each of the plurality of class fuzzy sets and the document fuzzy set; and using the measured degree of match to assign the text object a label that satisfies a selected decision making rule.

In accordance with another aspect of the invention, a text object is classified by: extracting a set of granule features from the text object; constructing a document granule feature fuzzy set using ones of the granule features extracted from the text object; each of the ones of the granule features extracted from the text object having a degree of membership in a corresponding granule feature fuzzy set of the document granule feature fuzzy set and a plurality of class granule feature fuzzy sets of a knowledge base; computing a degree of match between each of the plurality of class granule feature fuzzy sets and the document granule feature fuzzy set to provide a degree of match for each of the ones of the granule features; aggregating each degree of match of the ones of the granule features to define an overall degree of match for each feature; and using the overall degree of match for each feature to assign the text object a class label that satisfies a selected decision making rule.

BRIEF DESCRIPTION OF THE DRAWINGS

These and other aspects of the invention will become apparent from the following description read in conjunction with the accompanying drawings wherein the same reference numerals have been applied to like parts and in which:

FIG. 12 illustrates a two-way contingency table of feature, f, and of category, c;

DETAILED DESCRIPTION

Outline Of Detailed Description

Figure 1:
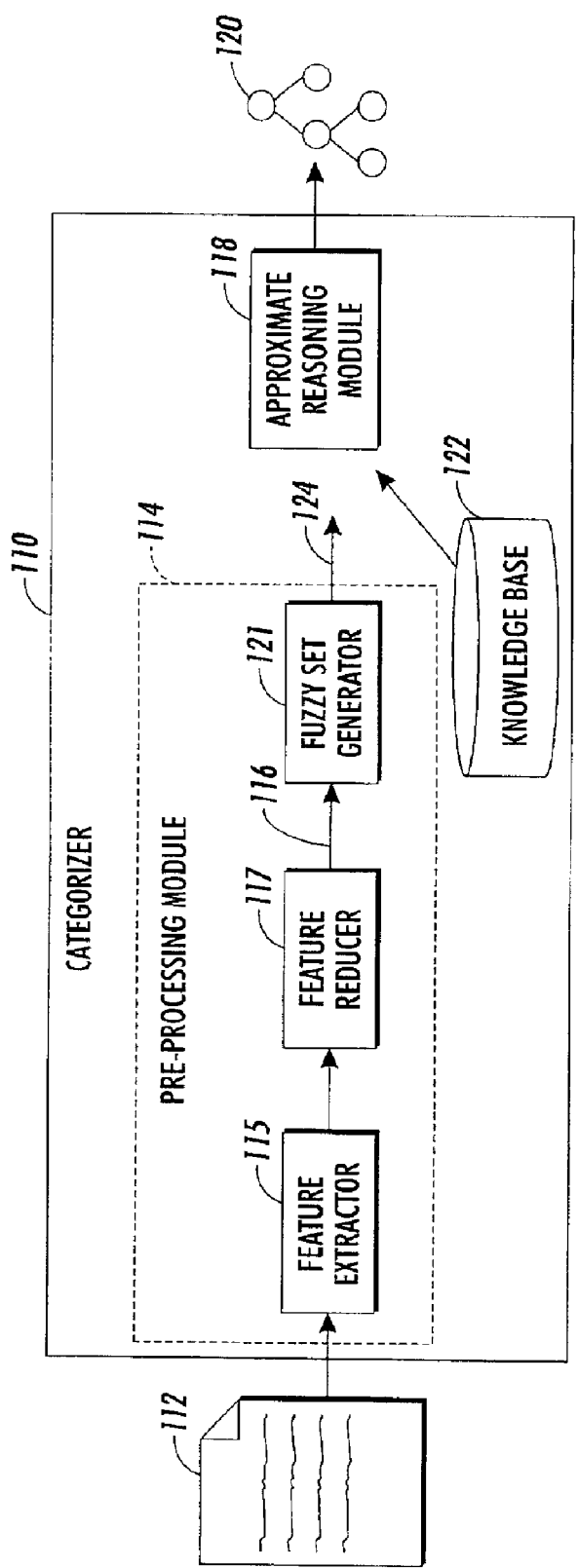
FIG. 1 illustrates a classification system with a categorizer for categorizing an unlabeled text object.

1. Overview
2. Class Fuzzy Set Models
2.A Pre-Processing Module
2.B Approximate Reasoning Module
3. Granule Feature Based Models
3.A Constructing Document Feature Fuzzy Sets
3.B Approximate Reasoning Using Granule Feature Based Models
3.C Learning Granule Feature Based Models
4. Converting A Probability Distribution To A Fuzzy Set
5. Miscellaneous 1. Overview FIG. 1 illustrates a classification system with a categorizer 110 for categorizing an unlabeled text object or document 112. The categorizer 110 classifies the unlabeled text object 112 into a set of one or more classes 120, which are also referred to herein as categories. The categorizer 110 includes a pre-processing module 114 and an approximate reasoning module 118. For the purpose of disclosing the embodiments of the invention, the document 112 is defined herein to include a single text object. However, it will be appreciated by those skilled in the art that the document 112 can be defined as having multiple text objects, where each text object is labeled with a separate set of one or more categories.

The text pre-processing module 114 includes a feature extractor 115 that consumes the unlabeled text object 112 and produces feature vector 116. The terms selected features or feature vector are used herein to mean a set of features that are used for learning a text classification system or that are used to classify unlabelled text objects. A feature reducer 117 reduces the features produced by extractor 115 to limit the features produced by extractor 115 to a predefined threshold number or range of features. In an alternate embodiment, the pre-processing module 114 does not include feature reducer 117 and outputs unmodified results from the extractor 115.

Figure 2:
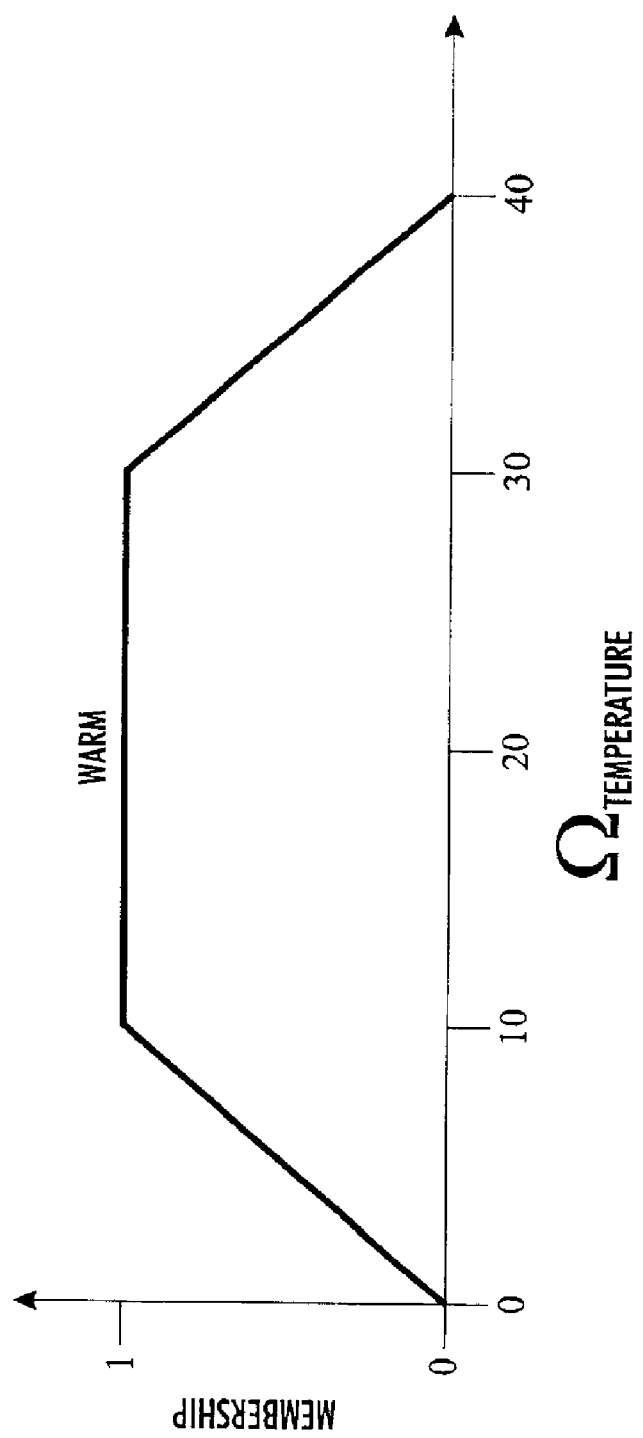
FIG. 2 graphically depicts an example of a fuzzy set.

In one embodiment, a fuzzy set generator 121 uses the feature vector 116 to define a document fuzzy set 124 that represents the text object. In an alternate embodiment, the feature vector 116 is output by pre-processing module 114 directly to the approximate reasoning module 118. As defined herein, a fuzzy set is a mapping from a universe of values to a unit interval (e.g., unit interval [0,1]) (i.e., each element in the universe over which a variable is defined is assigned a membership value, which can be interpreted as the degree of prototypicality of this value to the concept being represented by the fuzzy set). Consider an example graphically depicted in FIG. 2 for a linguistic variable representing temperature in Celsius. The example provides that if the linguistic variable for temperature is defined on a universe consisting of the interval [0, 40], then the fuzzy set Warm in that universe could be defined as follows:

$$\mu_{Warm}(x) = \begin{cases} 0 & \text{if } x \leq 0 \\ \dfrac{x}{10} & \text{if } 0 < x < 10 \\ 1 & \text{if } 10 < x \leq 30 \\ \dfrac{40-x}{10} & \text{if } 30 < x < 40 \\ 0 & \text{if } x \geq 40 \end{cases}$$

where $\mu_{Warm}(x)$ denotes the membership value of the value x for temperature in the Warm fuzzy set. In this case, frequency values in the interval [10, 30] have a membership value of 1 and correspond to the core of the fuzzy set. Values in the intervals [0, 10] and [30, 40] have membership values in the range [0, 1], while other values in the universe have membership values of zero in this definition of the concept of Warm temperature.

Referring again to FIG. 1, the approximate reasoning module 118 computes the degree of similarity (i.e., degree of match) between the unlabelled text object 112 that is represented in terms of the feature vector 116 or the document fuzzy set 124 and one or more categories 120. The approximate reasoning module 118, which contains matching, filtering and decision making mechanisms, accesses a knowledge base 122 (i.e., rule base) to classify the unlabelled text object 112. In a first embodiment, the knowledge base 122 contains fuzzy rules (also referred to as rules) for each class (i.e., category), where each rule is made up of a class fuzzy set and an associated class filter. In a second embodiment, each rule is made up of a granule fuzzy set the details of which are presented in section 3 below.

During operation of the first embodiment, the approximate reasoning module 118: (1) calculates the degree of match between the document fuzzy set 124 and a fuzzy set associated with each class (i.e., each class fuzzy set); (2) passes the resulting degree of match through a respective filter function (i.e., class filter); and (3) determines a class label to assign to the unlabelled text object based upon the filtered degrees of match (e.g., the class label associated with the highest degree of match is assigned to be the class label of the text object).

Figure 3:
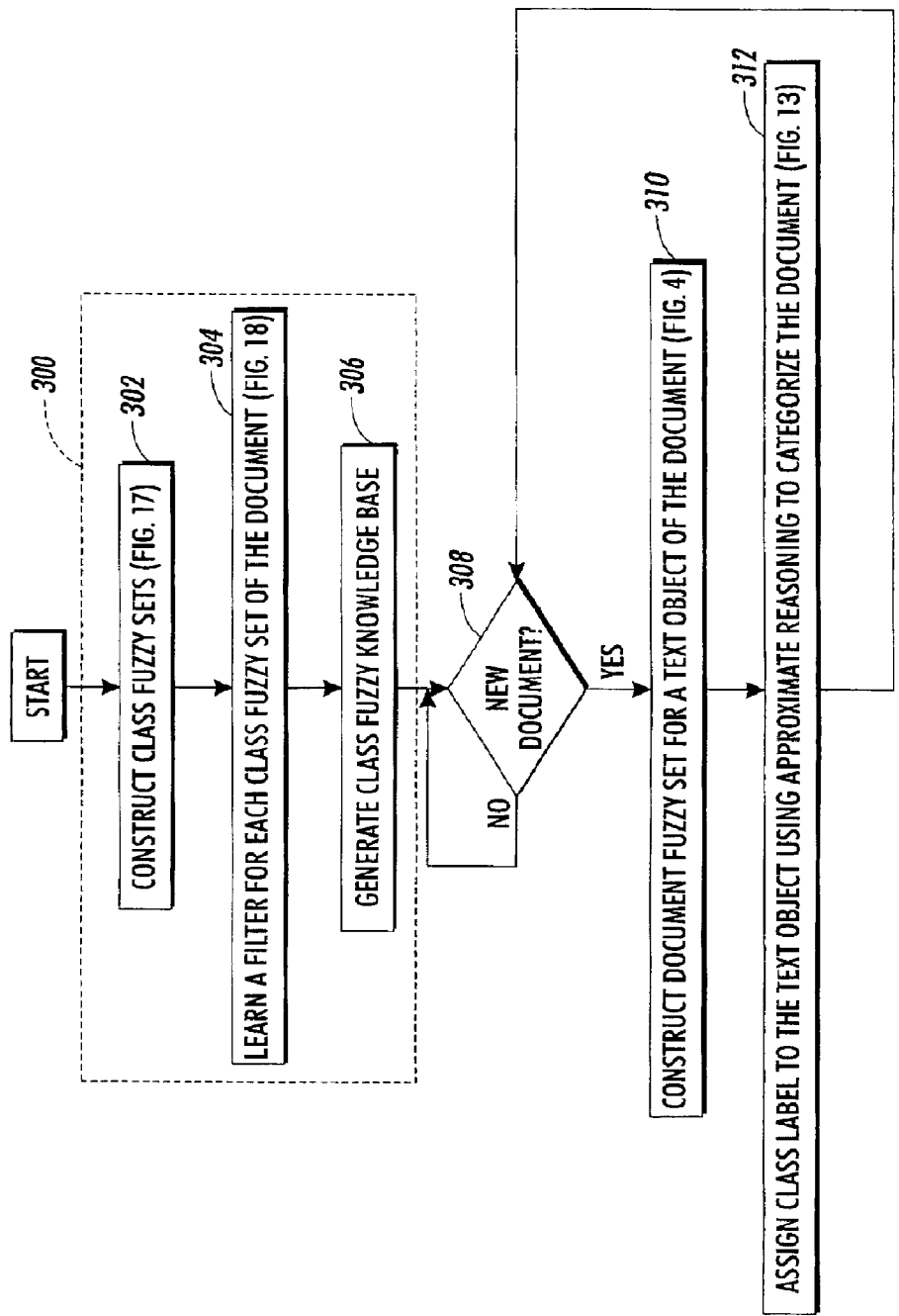
FIG. 3 is a general flow diagram of one embodiment for categorizing an unlabeled text object with a categorizer that uses a class fuzzy set model.

FIG. 3 presents a general flow diagram for categorizing an unlabeled text object 112 with the categorizer 110. Initially, in accordance with one embodiment of the invention using the categorizer 1600 shown in FIG. 16, a fuzzy set is learned for each class of document at 300. Generally, learning class fuzzy sets includes: constructing class fuzzy sets at 302; learning a filter for each class fuzzy set at 304; and generating a class fuzzy knowledge base at 306. Learning is discussed in more detail in section 2.C.2 with reference to FIGS. 16–18. In an alternate embodiment using the categorizer 110 shown in FIG. 1, class fuzzy sets, rules, and filters are predefined and stored as part of knowledge base 122.

Subsequently, at 308 for each new document 112 consisting of at least one unlabeled text object that is input to the categorizer 110 or the categorizer 1600, acts 310 and 312 are repeated. At 310, the pre-processing module 114 constructs a document fuzzy set for the unlabeled text object 112, which operations are described in detail in FIGS. 4 and 8. Subsequently at 312 given (pre-existing or learned) knowledge base 122, the approximate reasoning module 118 assigns class label(s) to the unlabeled text object 112 to categorize the document, which operations are described in detail in FIG. 13.

2. Class Fuzzy Set Models

This section describes the first embodiment of the present invention in greater detail while referring to FIGS. 4–18.

2.A Pre-Processing Module

The purpose of the text pre-processor 114 is to transform the document or text object 112 into a representation that facilitates the approximate reasoning module 118 to perform the task of document classification in an accurate, automatic, efficient and effective manner. In this first embodiment, the transformation process can be decomposed into the following three subtasks: feature extraction 115; feature reduction 117; and fuzzy set generation 121.

To generate the feature vector 116 from unlabeled text object 112, the pre-processing module 114 may embody a number of components such as text converters (e.g., HTML to text, PDF to text, postscript to text), a tokenizer, a stemmer, a word frequency analyzer, a grammar feature analyzer, and/or a noun phrase analyzer (or extractor). A commercial application that provides similar functions performed by the text-processing module 114 is Thingfinder offered by Inxight Software, Inc.

Figure 4:
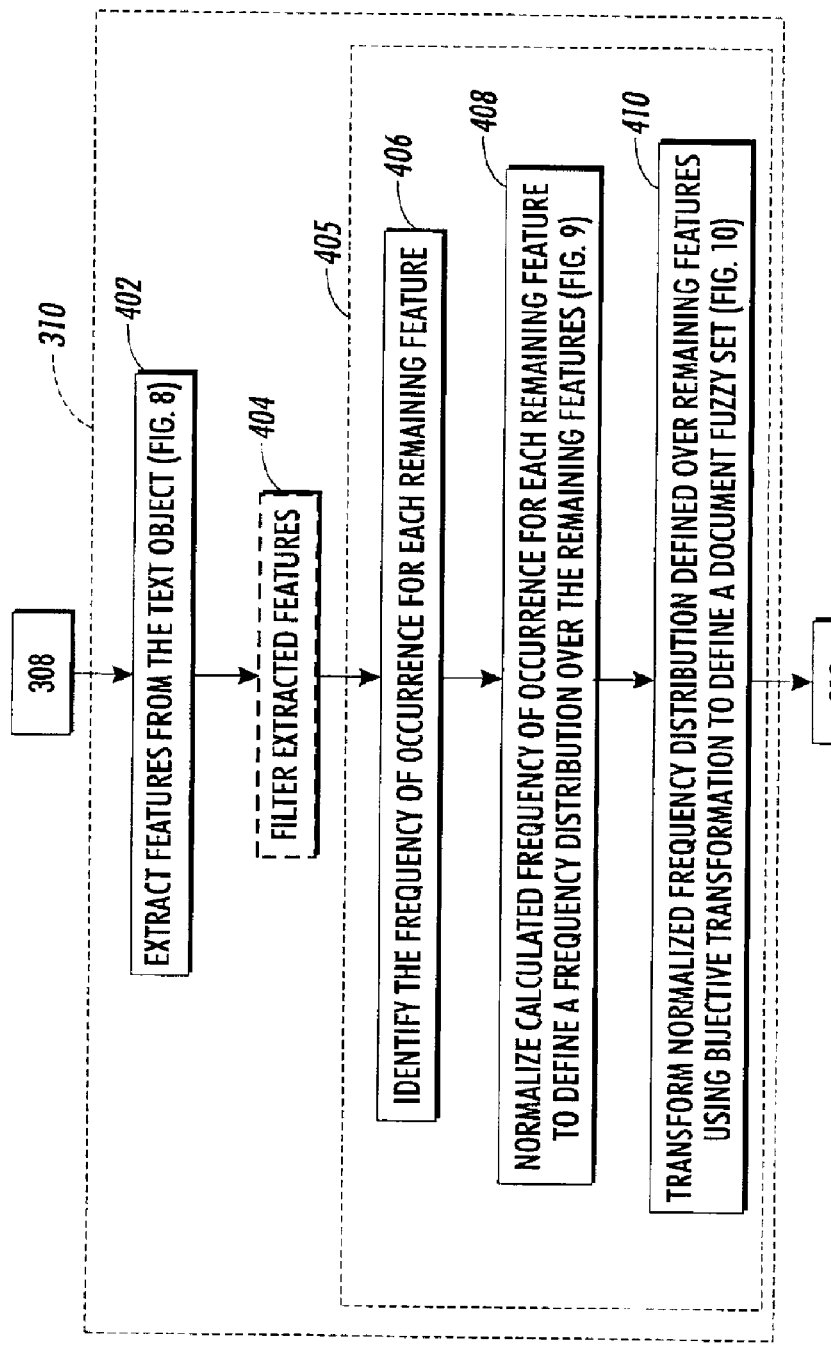
FIG. 4 presents a flow diagram of functions performed by the pre-processing module to produce a fuzzy set from an unlabeled text object, which is depicted generally at 310 in FIG. 3.

FIG. 4 presents a flow diagram of functions performed by the pre-processing module 114 to produce a fuzzy set from a (unlabeled) text object 112, which is depicted generally at 310 in FIG. 3. At 402, features are extracted from the unlabeled text object 112 by feature extractor 115. At 404, the extracted features are optionally filtered by feature reducer 117 to reduce the number of features extracted at 402 by a predefined threshold number or range.

Using the reduced or remaining features, the fuzzy set generator 121 uses the feature vector 116 produced by feature reducer 117 to generate document fuzzy sets 124 at 405. Act 405 includes performing acts 406, 408, and 410 in which the fuzzy set generator: identifies the frequency of occurrence for each remaining feature (at 406); normalizes the calculated frequency of occurrence for each remaining feature to define a frequency distribution over the remaining features (at 408); and transforms the normalized frequency distribution defined over the remaining features using the bijective transformation, as described below in section 4, to define a document fuzzy set (at 410).

2.A.1 Feature Extraction

The feature extractor 115 generates a feature vector from a document (i.e., a text object). The generated feature vector consists of tuples (i.e., a set of ordered elements) of the form <featureID, value>, where "featureID" corresponds to a unique identifier that denotes a feature (e.g., the characters that makeup a word such as "Xerox" in the case of word features or a unique number that can be used to retrieve the feature when stored in a database or hash table) and where "value" can be a real number, a binary value, a fuzzy set, or a probability distribution (e.g., the frequency of occurrence of the word feature "Xerox" in a text object). A value can be associated with a featureID using: normalized frequency distributions; smoothed frequency distributions; fuzzy sets; and granule fuzzy sets.

An example of a feature is a word feature. The word feature is identified by a featureID that identifies a selected word. The value associated with each word feature is the number of occurrences of that selected word appears in the text object. More generally, document features produced from a text object by the pre-processing module 114 may include: (a) a set of words; (b) a set of noun phrases; (c) a set of identified entities such people names, product name, dates, times, book titles etc.; (d) a set of grammar-based features (e.g., FIGS. 5 and 6); (e) a set of dependency-based features (e.g., FIG. 7); or (f) combinations of (a)–(e) collectively referred to herein as a set of features.

Figure 5:
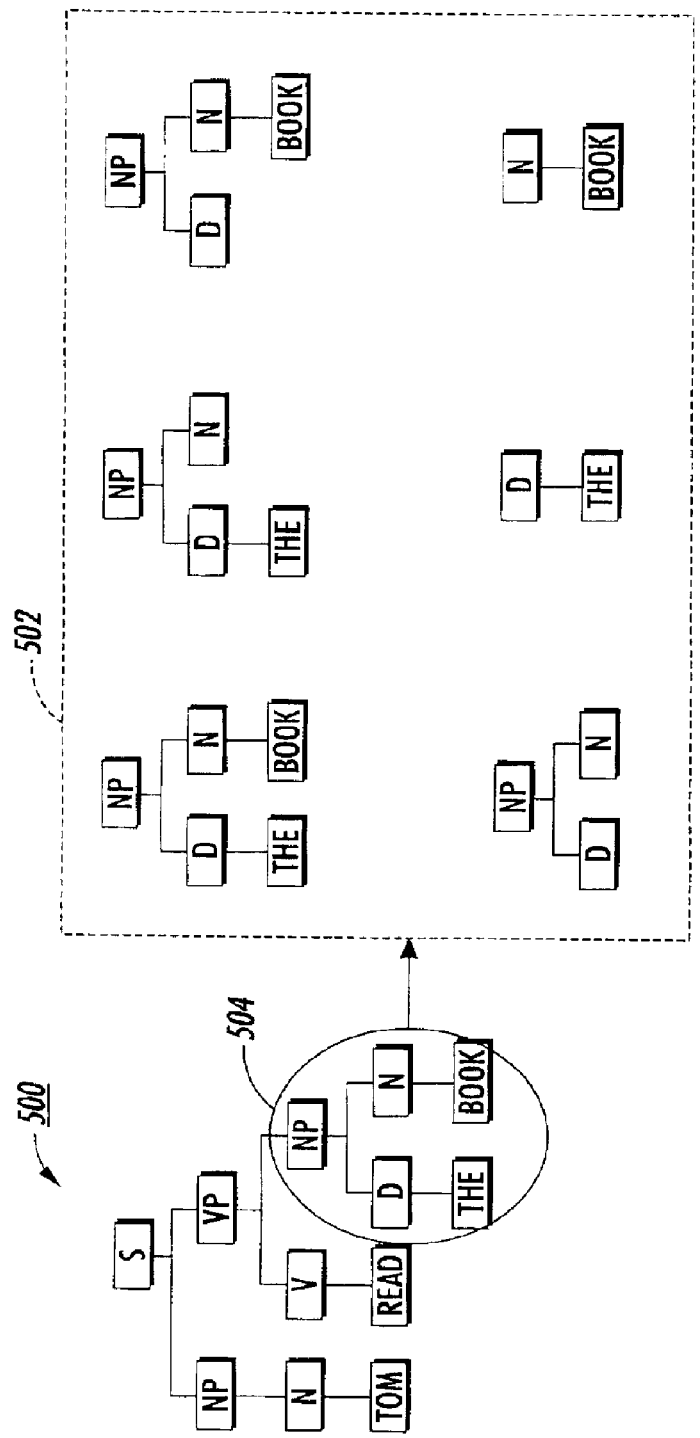
FIG. 5 illustrates an example of a parse tree of grammar-based features that could be extracted from the example sentence "Tom read the book" as well as six possible subtree-based features of noun phrases for "the book" element of the parse tree.
Figure 6:
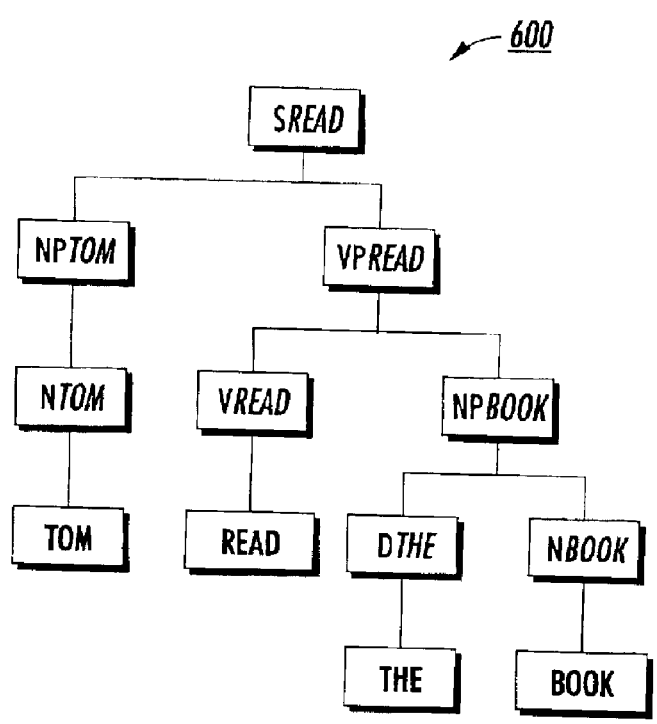
FIG. 6 illustrates an example of a lexicalized parse tree of lexicalized grammar based features for the example parse tree shown in FIG. 5.

FIGS. 5 and 6 illustrate parse trees 500 and 600 of grammar-based features that could be extracted from the example sentence "Tom read the book", respectively. Each parse tree uses the following grammatical notation: "S" to represent a sentence; "NP to represent a noun phrase; "D" to represent a determiner; "V" to represent a verb; and "VP" to represent a verb phrase.

More specifically, FIG. 5 illustrates six possible subtree-based features at 504 of noun phrases for "the book" element 502 of the parse tree 500. Words that makeup features extracted from the sentence could be stemmed using known techniques such as Porter's stemming algorithm, as described by Porter in "An Algorithm For Suffix Stripping", Program, Vol. 14, No. 3, pp. 130–137, 1980 (herein referred to as "Porter's stemming algorithm"). In contrast, FIG. 6 illustrates a lexicalized parse tree 600, with lexicalized grammar based features defined as shown for the parse tree 500 in FIG. 5. However, unlike the parse tree 500 shown in FIG. 5, the lexicalized parse tree 600 shown in FIG. 6 also includes the word, not just grammar notations. That is, each phrasal node in the lexicalized parse tree 600 is marked by its head-word (e.g., V (verb) read).

Figure 7:
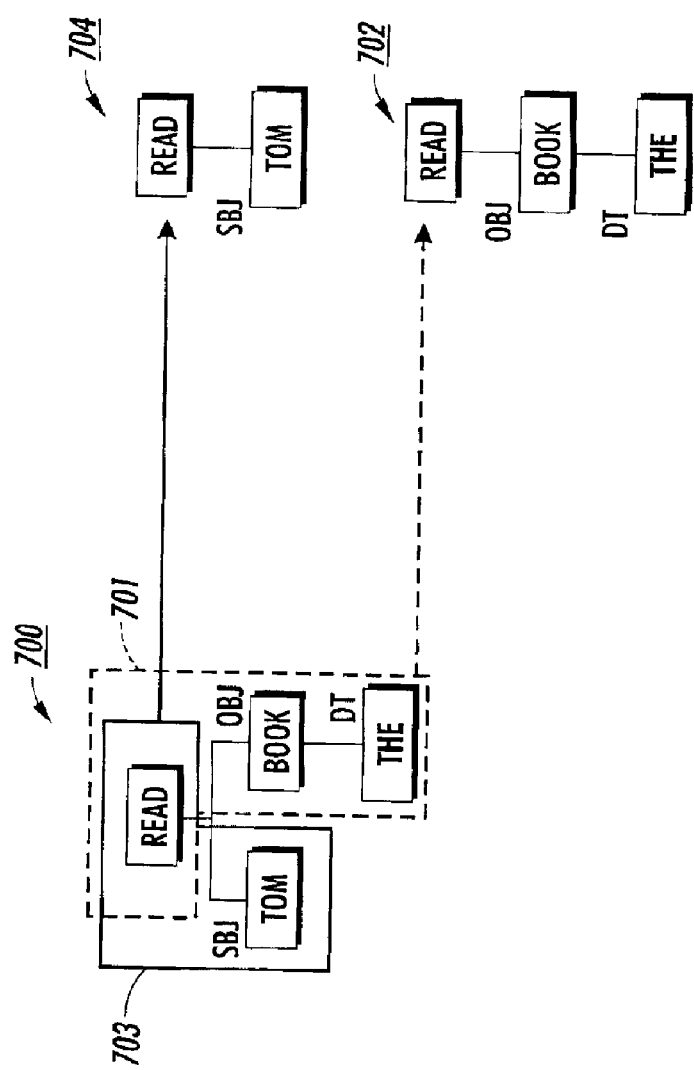
FIG. 7 illustrates an example of a set of dependency-based features that are defined using a dependency graph.

FIG. 7 illustrates an example of a set of dependency-based features that are defined using a dependency graph 700. The dependency graph 700 represents the sentence "Tom read the book" using nodes and arcs. Each node represents a word in the sentence and each arc signifies a dependency from a head word to a modifier. The arcs are labeled with a grammatical relationship, where in this example "sbj" denotes a subject and "obj" denotes an object, and "dt" denotes a direct object. Features 702 and 704 represent two dependency-based features that can be extracted from the dependency graph 700 at 701 and 703, respectively.

2.A.1.a Basic Feature Extraction

Figure 8:
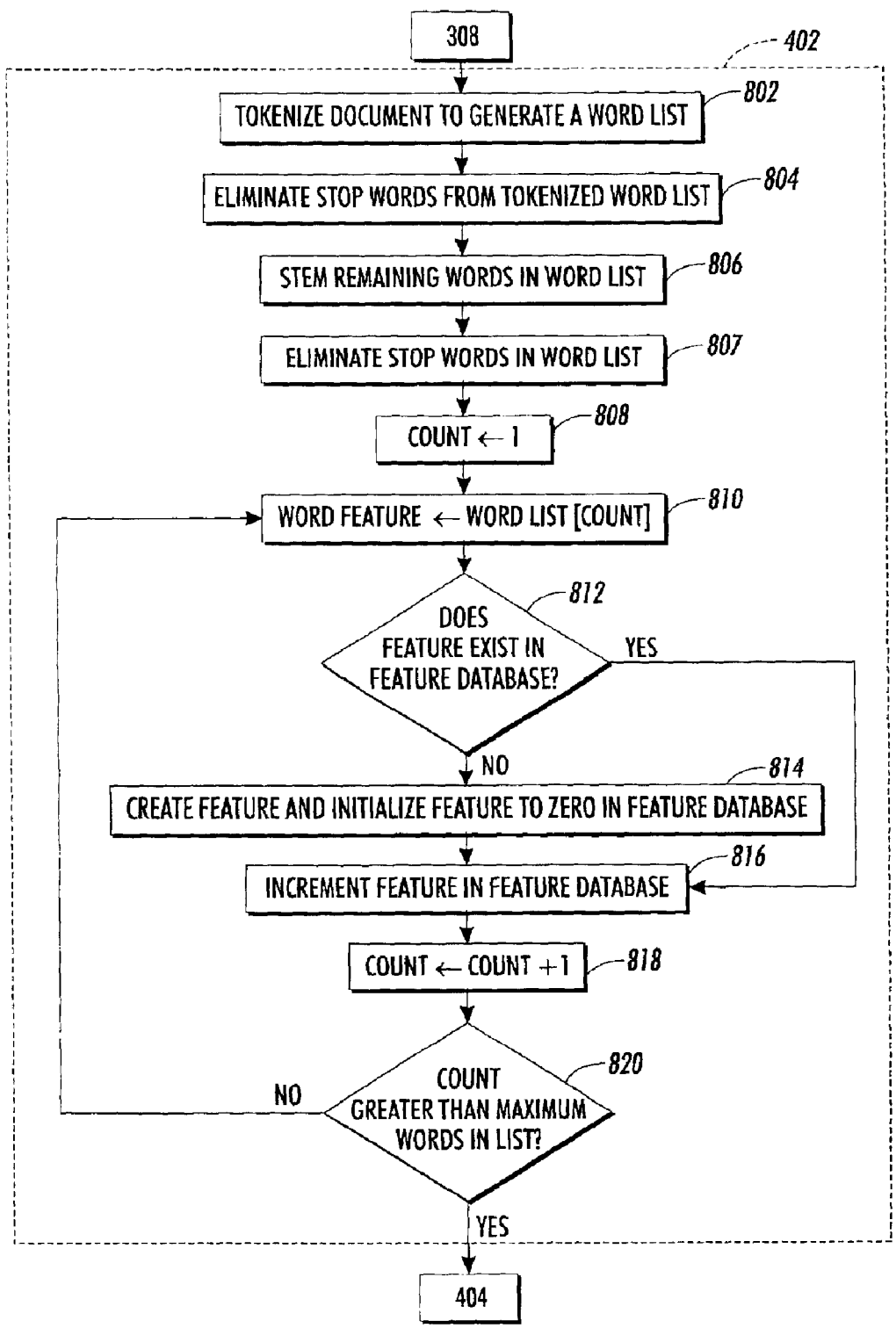
FIG. 8 depicts a flow diagram of one embodiment for extracting features from a text object at 402 shown in FIG. 4.

FIG. 8 depicts a flow diagram of one embodiment for extracting features from a text object at 402 shown in FIG. 4. Although the description of feature extraction is limited to word feature extraction, it will be appreciated by those skilled in the art that a similar approach can be used to extract other types of features described above. In accordance with this embodiment, a document is transformed into lists of tokens or word list (at 802) that are delimited by spaces, and punctuation characters. Tokens that correspond to stop words (i.e., words that do not improve the quality of the categorization such as "the", "a", "is", etc.) are subsequently eliminated from this list of tokens (at 804). The remaining tokens in the list are then stemmed using Porters stemming algorithm (at 806). Subsequently, stop words are removed from the stemmed word list (at 807), resulting in a list of words.

Finally, this list of words is transformed to a frequency distribution consisting of <term, frequency> tuples where frequency denotes the number of occurrences of that feature in the document to define a set of features (at 808, 810, 812, 814, 816, 818, and 820). A word list count initialized at 808 is used to index into each word (i.e., feature) in the word list. If the feature is not located at 812 in the feature database, then the feature or unique identifier associated with the feature (i.e., FeatureID) is inserted into the feature database and its frequency is set to zero at 814. If the feature already exists in the feature database or the feature database is initialized at 814, then its frequency of that feature is incremented by one at 816. To process the next word, the word count is incremented by one at 818. This counting process terminates at 820 once all the text segments have been processed.

Different combinations of known techniques from natural language processing such as translation of HTML to text, tokenization, stemming, stop word removal, and entity recognition can be used to identify a set of features. In an alternate embodiment grammar based features are identified at 802. In this alternate embodiment, in addition to tokenization of the document into words as delimited by white spaces, or punctuation characters, supplemental parsing is performed to identify grammatical features (e.g., noun phrases), and/or various other syntactical structures such as parse trees or parse-subtrees, or string subsequences (as disclosed by Cristianini et al., in "An Introduction To Support Vector Machines", Cambridge University Press, Cambridge, UK, 2000, Section 3.3.3). It will therefore be appreciated by those skilled in the art that multiple types features may be assigned to the document and need not be limited to one type (e.g., word features) as described in the embodiment shown in FIG. 8.

Also, rather than incrementing the value associated with a feature by one at 816 when the occurrence of a feature is located in a text segment, the value could be incremented in a more intuitive manner, such as an increment value that is defined using an aggregation of a number of measures such as the frequency of each feature in the document, its location in a document, the frequency of each feature (e.g., term) in a reference corpus, and the inverse document frequency of the term as described by Bordogna, et al., in "A Linguistic Modeling Of Consensus In Group Decision Making Based On OWA Operators", IEEE Transactions on Systems, Man and Cybernetics 27 (1997), pp. 126–132. The textbook by Manning and Schutze, "Foundations Of Statistical Natural Language Processing", published in 1999, MIT Press, Cambridge, Mass., provides additional background relating to text pre-processing performed at 816.

2.A.1.b Fuzzy Set Feature Extraction

In one embodiment, the acts which are set forth at 405 in FIG. 4 are performed to create a document fuzzy set. In accordance with this embodiment, after computing a feature value (e.g., the frequency of occurrence of each feature) identified at 406, the frequency values associated with each feature are normalized such that all feature values sum to one. This process results in a frequency distribution consisting of tuples <featureID, value> with a tuple for each feature that is extracted.

Figure 9:
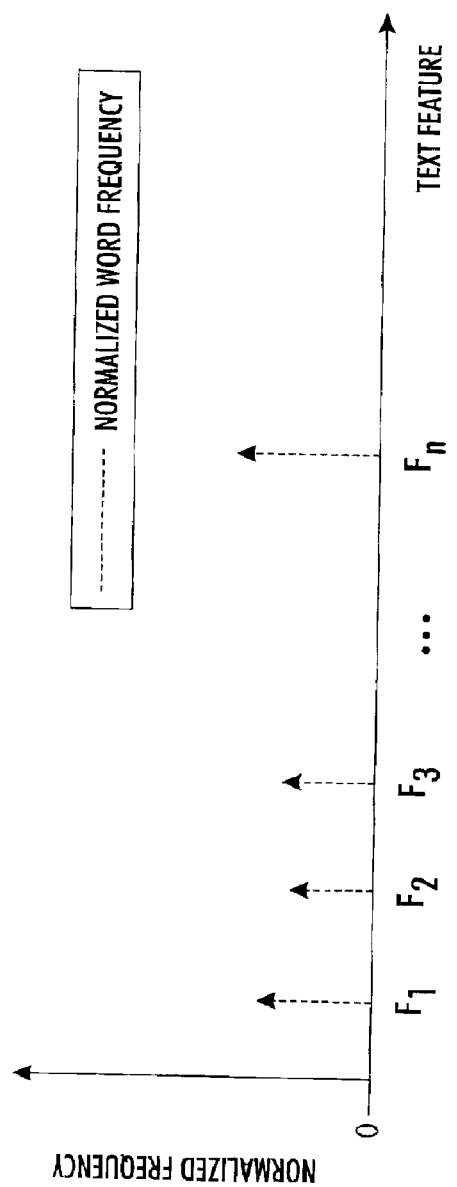
FIG. 9 illustrates an example normalized frequency distribution, where the horizontal axis represents each of the text features considered by the categorizer, and where the vertical axis represents the frequency of feature $f_i$ in the fuzzy set.

FIG. 9 illustrates an example frequency distribution, where the horizontal axis represents each of the features (e.g., words) considered by the categorizer, and where the vertical axis denotes the frequency (normalized or otherwise) of feature $f_i$ in the fuzzy set. There is no explicit order to the features (e.g., words) on the horizontal axis though each feature can be thought of being associated/indexed by a unique key $f_i$ and ordered according to that key.

In the embodiment with learning shown in FIG. 16, each feature value can be estimated during training (i.e., construction of a text classifier) using the m-estimate as follows (for more background see Mitchell in Machine Learning, Mc Graw-Hill, New York, 1997):

$$\text{value} = \frac{Freq(featureID, Doc) + 1}{|Doc| + |Vocab|},$$

where Freq(featureID, Doc) denotes the number of occurrences of the feature (i.e., featureID) in the text object Doc; |Vocab| denotes the number of unique features considered as the language of the model (i.e., the number of variables used to solve the problem); and |Doc| denotes the length of the text object in terms of all features considered.

Figure 10:
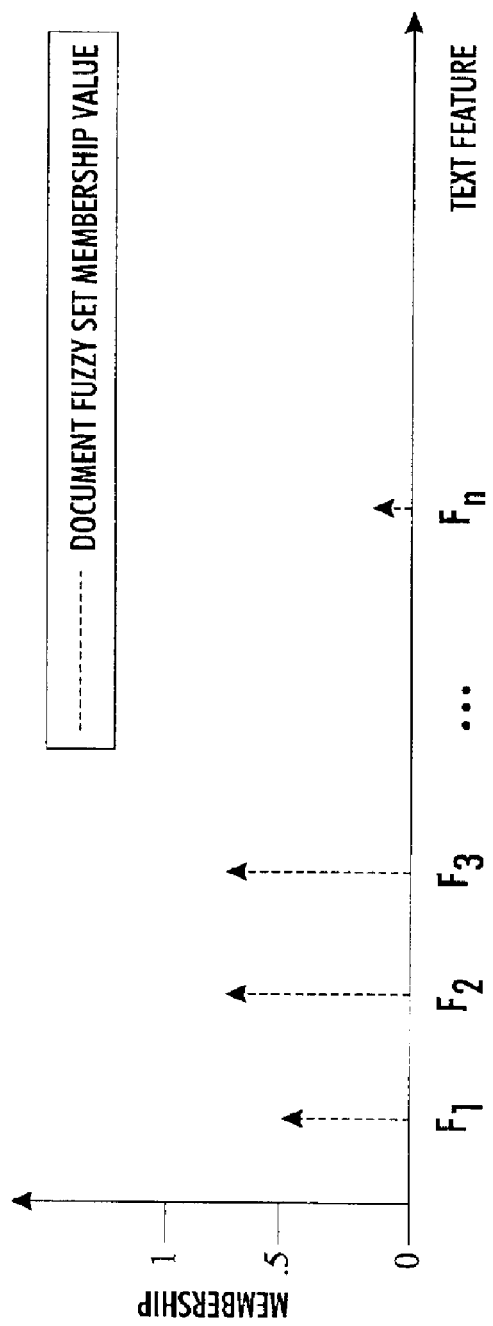
FIG. 10 illustrates an example of a document fuzzy set for a text object, where the horizontal axis represents each of the text features considered, and where the vertical axis denotes the membership value of feature $f_i$ in the fuzzy set.

Referring again to FIG. 4 at 410, a text object can be represented as a discrete fuzzy set consisting of tuples of the form <featureID, $\mu_{TextObject}$(featureID)> where featureID is a text feature as described above and $\mu_{TextObject}$(featureID) denotes the membership value (or degree of prototypicality) of the feature for the document fuzzy set. An example of a document fuzzy set for a text object is depicted in FIG. 10, where the horizontal axis represents each of the features (e.g., words) considered in the system (having no explicit order though each feature can be thought of being associated/indexed by a unique key $f_i$ and ordered according to that key), and where the vertical axis denotes the membership value of feature $f_i$ in the fuzzy set. This document fuzzy set is derived from a normalized frequency distribution of occurrence for each feature using the bijective transformation process described in section 4 below.

2.A.1.c Granule Fuzzy Set Feature Extraction

In another embodiment (also referred to herein as the second embodiment and described in detail in section 3), feature values defined over the normalized frequency domain of zero to one interval [0, 1] are represented as granule fuzzy sets. A granule fuzzy set is a set of granules and corresponding membership values, where each granule is represented by a fuzzy set and an associated (word) label. Background of granule fuzzy sets is disclosed by Shanahan in "Soft Computing For Knowledge Discovery: Introducing Cartesian Granule Features", Kluwer Academic Publishers, Boston, 2000 (hereinafter referred to as "Soft Computing by Shanahan"), which is incorporated herein by reference.

Figure 11:
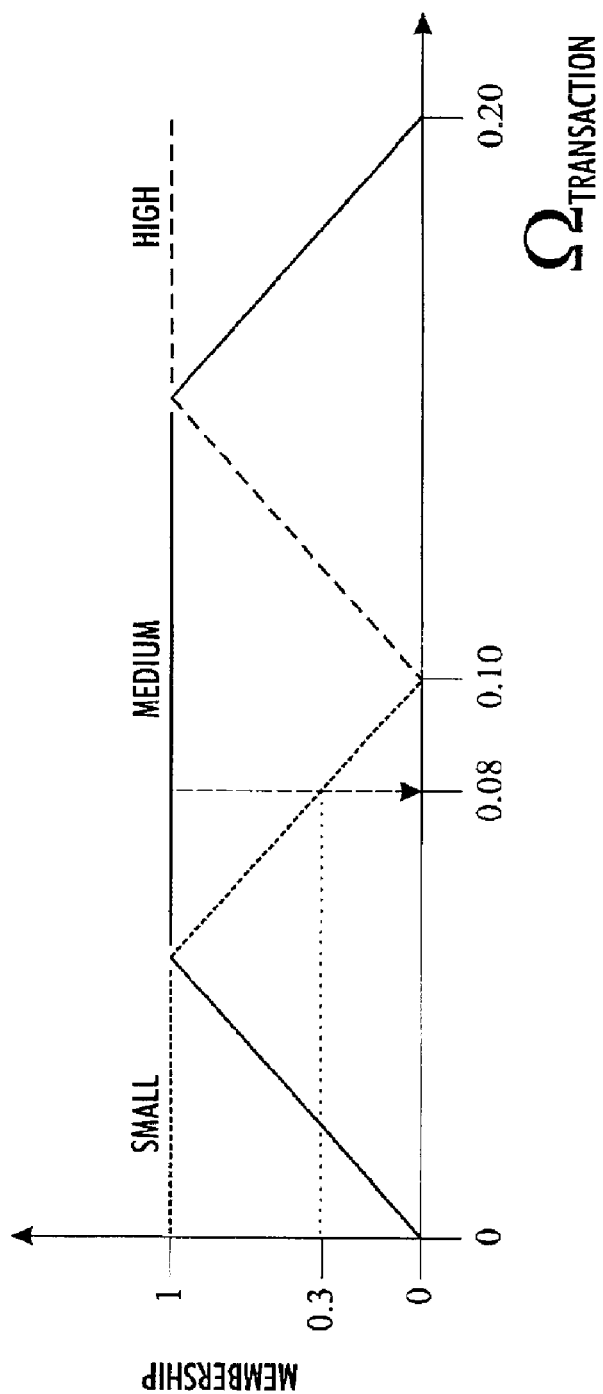
FIG. 11 illustrates an example of granule fuzzy sets for the text feature "transaction"

For example, granule fuzzy sets for frequency variables are illustrated in FIG. 11 using an example frequency variable for the word feature "transaction". Generally when constructing a granule fuzzy set, the universe is partitioned over that which a variable is defined using a plurality of fuzzy sets. This is graphically depicted in FIG. 11 for the frequency variable associated with the word feature "transaction". In this example, the plurality of fuzzy sets used to partition frequency universe of the word feature "transaction" is labeled using the following list of word labels in partition:

$P_{Transaction}$={Small, Medium, High}.

This fuzzy partition can be constructed using a number of approaches such as clustering, or percentile-based partitioning as outlined in Soft Computing by Shanahan. One type of partition can be used for all features, or a specific fuzzy partition can be used for each feature. Having constructed a fuzzy partition of the feature's frequency universe, the granules denoted by word labels that make up the partition are used to interpret the frequency value.

Using this fuzzy partition, the frequency extracted for the transaction feature is linguistically re-interpreted. This corresponds to calculating the degree of membership of the frequency of transaction in each of the fuzzy sets that partition the domain of the frequency variable. This process is depicted in the example shown in FIG. 11 for the frequency of 0.08. It results in the following granule fuzzy set or linguistic description of 0.08: {Small/0.3+Medium/1.0}. This granule fuzzy set can be interpreted as saying that Medium is a more prototypical label (description) for a normalized frequency of 0.08 than Small.

2.A.2 Feature Reduction

The feature extractor 115 described above when applied to a text object can potentially lead to a feature vector consisting of millions of features. To make fuzzy set formation more feasible at 405 in FIG. 4 or at 300 in FIG. 3, the feature vector extracted from a text object at 402 may be reduced to fewer elements or a predefined number of elements using feature reducer 117 shown in FIG. 1. Various techniques can be used to enable feature reduction at 404 in FIG. 4.

In one embodiment for filtering extracted features at 404, a database (i.e., corpus) of example text documents is used to perform feature reduction. Typically this corpus forms all or a subset of training database 1604 shown in FIG. 16 that is used to learn the knowledge base 122 in categorizer 1600. In this section it is assumed that the training database 1604 is used for feature reduction. It will be appreciate by those skilled in the art that the training database can form part of the feature reducer 117 or alternatively be separate from the categorizer as shown in FIG. 16.

More formally, the training database 1604 is a collection of labeled documents consisting of tuples <$D_i$, $L_i$> where $D_i$ denotes a document, and $L_i$ denotes a class label associated with the document $D_i$. Feature reduction can be applied at two levels of granularity: corpus-based feature reduction; and category-based feature reduction. Processes for performing each type of feature reduction are described below. In one embodiment, corpus-based feature reduction is applied first and subsequently category-based feature reduction is applied to the feature vector produced by the feature extractor 115.

2.A.2.a Corpus-Based Feature Reduction

The process of corpus-based feature reduction begins by merging all training documents into one text object. Subsequently, feature extraction is applied to this text object. Having extracted the features and corresponding frequency values for the text object, Zipf's Law and/or latent semantic indexing (LSI) can be applied to filter those features that are most important, thereby reducing the overall number of extracted features.

Zipf's law, which is known in the art, concerns the distribution of different words in a text object and states that the product of a feature's frequency (while generalizing Zipf's law to include text features as well as words) in a text object, f, and its rank, r, is a constant, c (i.e., $f*r=c$). In accordance with Zipf's law, words having a low frequency will not be useful in classifying new items. In addition, words that have a high frequency typically occur in all classes and thus will not help in discriminating between classes. Consequently, a feature vector is reduced using Zipf's law by eliminating features that occur frequently or very rarely.

In an alternative embodiment, these Zipf-based selection criteria are applied to each document in the training database 1604 to eliminate features that have low or high frequency within each document in the training database 1604. The reduced feature set of each document in the training database 1604 is formed by taking the set union of the selected features, thereby creating a reduced feature training database. Zipf-based reduction could once again then be applied to this union of features.

In yet another embodiment, LSI is used to translate the extracted feature space into latent concepts space that can be used to explain the variance-co-variance structure of a set of features through linear combinations of these features. Having identified the latent concepts, also known as latent features, in a feature space they can be used directly as input for the categorization process instead of the extracted features. Typically only the top n latent features are selected whereby the variables are ordered in decreasing order of the amount of variance that each latent feature explains. Alternatively, only a minimum subset of the latent features that explain a percentage of the variance is used. The details of LSI are disclosed by Deerwester, Dumais, Fumas, Landauer, and Harshman, in "Indexing By Latent Semantic Analysis" Journal of the American Society for Information Science, 41(6), 391–407, 1990.

2.A.2.b Category-Based Feature Reduction

Category-based feature reduction reduces features by examining separation or discrimination properties provided by class features. One or more of the following techniques described below can be used to reduce the number of features in this way: (1) a mutual information technique; and (2) a semantic separation technique for granule fuzzy sets. In addition, other known approaches that are not discussed here such as a chi-square technique, an information gain technique that measures the number of bits of information obtained, and a technique using a correlation coefficient, can be used to reduce the number of features in a similar way.

2.A.2.b.1 Mutual Information

The mutual information (MI) technique measures the extent to which a text feature is associated with a text category. Features that exhibit high values for mutual information are good discriminators and should therefore be selected, whereas low values (zero or close to zero) indicate that a feature and class are independent and therefore will not contribute to a good class definition and should be eliminated. In an exemplary embodiment, the mutual information for a given feature, f, in a given category, c, is calculated as follows:

$$MI(f, c) = Pr(f^+, c^+)\log\left(\frac{Pr(f^+, c^+)}{Pr(f^+)Pr(c^+)}\right) +$$
$$Pr(f^+, c^-)\log\left(\frac{Pr(f^+, c^-)}{Pr(f^+)Pr(c^-)}\right) +$$
$$Pr(f^-, c^+)\log\left(\frac{Pr(f^-, c^+)}{Pr(f^-)Pr(c^+)}\right) +$$
$$Pr(f^-, c^-)\log\left(\frac{Pr(f^-, c^-)}{Pr(f^-)Pr(c^-)}\right),$$

where: $Pr(f^+,c^+)$ denotes the probability that a document has feature f and belongs to category c; $Pr(f^+,c^-)$ denotes the probability that a document has feature f and does not belong to category c; $Pr(f^-,c^+)$ denotes the probability that a document does not have feature f and belongs to category c; and $Pr(f^-, c^-)$ denotes the probability that a document does not have a feature f and does not belong to category c.

For example, FIG. 12 illustrates a two-way contingency table of feature, f, and of category, c. Each document exhibits one of the following four characteristics: (i) the document contains feature f and belongs to category c (denoted as $f^+,c^+$); (ii) the document contains feature f and does not belong to category c (denoted as $f^+,c^-$); (iii) the document does not contain feature f and belongs to category c (denoted as $f^-,c^+$); and (iv) the document does not contain feature f and does not belong to category c (denoted as $f^-,c^-$).

If: A denotes the number of documents exhibiting characteristic $f^+,c^+$; B denotes the number of documents exhibiting characteristic $f^+,c^-$; C denotes the number of documents exhibiting characteristic $f^-,c^+$; D denotes the number of documents exhibiting characteristic $f^-,c^-$; and N is the number of documents in the training database, then the mutual information MI(f,c) of feature "f" for a class "c" can be rewritten as follows:

$$MI(f, c) = \frac{A}{N}\log\left(\frac{AN}{(A+C)(A+B)}\right) + \frac{B}{N}\log\left(\frac{BN}{(A+B)(B+D)}\right) +$$
$$\frac{C}{N}\log\left(\frac{CN}{(A+C)(C+D)}\right) + \frac{D}{N}\log\left(\frac{DN}{(B+D)(C+D)}\right).$$

Given a training database, mutual information is computed for each feature in the input feature vector using the approach presented above. Subsequently, the features whose mutual information measure is less than a predetermined threshold are removed from the input feature vector. Alternatively, if the number of features is to be reduced to a predetermined number, n, then the input feature vector is reduced to the n features with the highest mutual information.

2.A.2.b.2 Semantic Discrimination Analysis

Semantic discrimination analysis examines the discriminating power of a granule feature by examining the mutual dissimilarity of classes as represented by granule fuzzy sets defined over these features. To calculate the semantic discrimination of a granule feature, the granule fuzzy sets corresponding to each text category needs to be constructed. In one embodiment, this is accomplished using the bijective transformation process presented in section 4 below for converting a probability distribution (as generated by the feature extraction module 115) to a fuzzy set.

Subsequently, a known probabilistic reasoning strategy based upon semantic discrimination analysis is used to determine the mutual dissimilarity of class fuzzy sets, as measured in terms of the point semantic unifications between each granule fuzzy set $FS_k$ and the other class fuzzy sets $FS_j$. This discrimination (i.e., Discrim) is formally defined as follows:

$$Discrim = \operatorname*{Min}_{k=1}^{c}\left(1 - \operatorname*{Max}_{\substack{j=1 \\ j \neq k}}^{c} Pr(FS_k \mid FS_j)\right), \text{ where:}$$

$$Pr(FS_k \mid FS_j) = \sum_{i=1}^{n} \mu_{FS_K}(f_i) \times Pr_{FS_j}(f_i),$$

such that $Pr(FS_k|FS_j)$ denotes the semantic match between fuzzy sets $FS_k$ and $FS_j$ in terms of point semantic unification; $Pr_{FS_j}(f_i)$ denotes the probability distribution obtained from the fuzzy set $FS_j$ using the process presented in section 4 below; $\mu_{FS_k}(f_i)$ denotes the membership value of $f_i$ in the fuzzy set of $FS_k$; c corresponds to the number of classes in the current system; and i ranges from 1 to n, where n corresponds to the number of features used.

Given a training database, a semantic discrimination measure is computed for each feature in the input feature vector using the approach presented above. Subsequently, the features whose semantic discrimination measure is less than a predetermined threshold are removed from the input feature vector. Alternatively, if the number of features is to be reduced to a predetermined number, n, then the input feature vector is reduced to the n features with highest semantic discriminations.

2.B Approximate Reasoning Module

This section describes a first embodiment of the approximate reasoning module 118 that uses feature-based models to classify a text object. As described below, the approximate reasoning module 118 include matching, filtering, and decision making mechanisms, which are described below in sections 2.B.1, 2.B.2, and 2.B.3, respectively.

Generally, text classification performed by the approximate reasoning module 118 can be represented as a functional mapping from a set of text features described above, $\{f_1, \ldots, f_n\}$, to a set of class values $\{c_1, \ldots, c_c\}$. Typically each class is represented as rule that describes the mapping from the features to a class. These rules form part of knowledge base 122.

More specifically, the approximate reasoning module 118 uses the class rules (i.e., class fuzzy sets and class filters) in knowledge base 122 to classify an unlabelled text object 112. Viewed as such, a text classification problem can be represented using a canonical knowledge base of the form:

$r_1$: IF filter$_1$ (DocumentFuzzySet is FuzzySetForClass$_1$) THEN Classification is Class$_1$;

$r_2$: IF filter$_2$ (DocumentFuzzySet is FuzzySetForClass$_2$) THEN Classification is Class$_2$;

. . .

$r_c$: IF filter$_c$ (DocumentFuzzySet is FuzzySetForClass$_n$) THEN Classification is Class$_c$. In this embodiment, each class Class$_i$ is represented by a corresponding rule $r_i$ that consists of just one condition, where DocumentFuzzySet and FuzzySetForClass$_i$ are fuzzy sets of the form $\{f_1/\mu_1, \ldots, f_n/\mu_n\}$, and of a class filter that is monotonic function having adjustable parameters/form, where feature indexes the range from 1 to n and $\mu_i$ denotes the membership value with feature $f_i$.

By representing each class as described above, various approximate reasoning strategies can be used to classify an unlabelled document. The approximate reasoning approach of this embodiment relies on strategies that have been demonstrated in a variety of fields from control to image understanding, and various aspects of text processing such as thesauri construction. Such systems modeling is further described in Soft Computing by Shanahan. Additionally, approximate reasoning strategies are further described in "Applied Research in Fuzzy Technology", edited by Ralescu, Kluwer Academic Publishers, New York, 1995.

In general, the approximate reasoning strategy consist of: (1) calculating the degree of match between each class fuzzy set, FuzzySetForClass$_i$, and the document fuzzy set, $\{f_1/\mu_{DocumentFuzzySet}(f_1), \ldots, f_n/\mu_{DocumentFuzzySet}(f_n)\}$ (as set forth in detail in section 2.B.1 below); (2) passing the resulting degree of match through the respective filter function (as set forth in detail in section 2.B.2 below); and finally (3) selecting a class label to assign to the unlabelled document based upon the filtered degrees of match (as set forth in detail in section 2.B.3 below).

The input to such reasoning strategies is a knowledge base and the document fuzzy set, DocumentFuzzySet, corresponding to an unlabelled document, Document. The document fuzzy set is constructed as described above using the bijective transformation process described in section 4 below. This results in a document fuzzy set DocumentFuzzySet of the form $\{f_1/\mu_{DocumentFuzzySet}(f_1), \ldots, f_n/\mu_{DocumentFuzzySet}(f_n)\}$. The knowledge base, as described above, can be learned or predefined.

2.B.1 Matching Strategies

Figure 13:
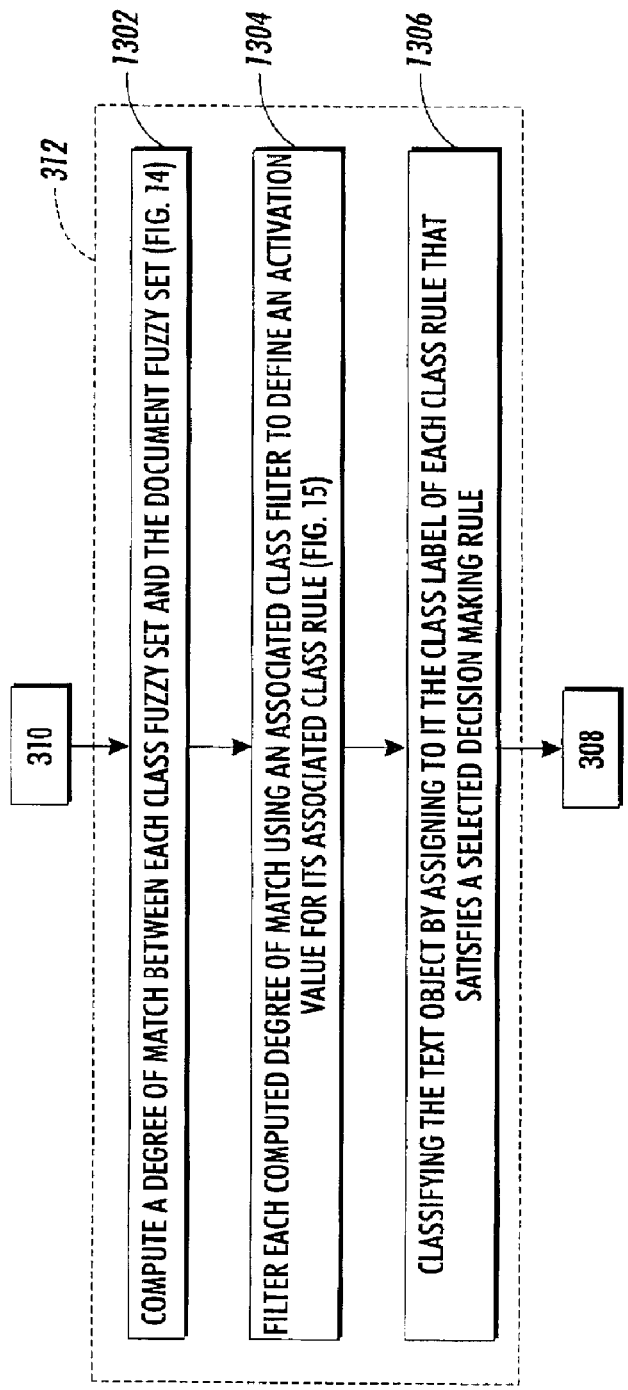
FIG. 13 depicts a flow diagram of an approximate reasoning strategy that specifies the acts performed at 312 in FIG. 3 for assigning a class label to an unlabeled text object using approximate reasoning.

An approximate reasoning strategy is depicted in a flow diagram in FIG. 13 that identifies the acts performed at 312 in FIG. 3 for assigning a class label to an unlabeled text object using approximate reasoning to categorize the unlabeled text object.

Initially, a degree of match between each class fuzzy set and the document fuzzy set is computed at 1302. This involves identifying fuzzy set matching strategies that are used to measure the degree of match between each class fuzzy set, FuzzySetForClass$_i$, and the document fuzzy set, DocumentFuzzySet.

Figure 14:
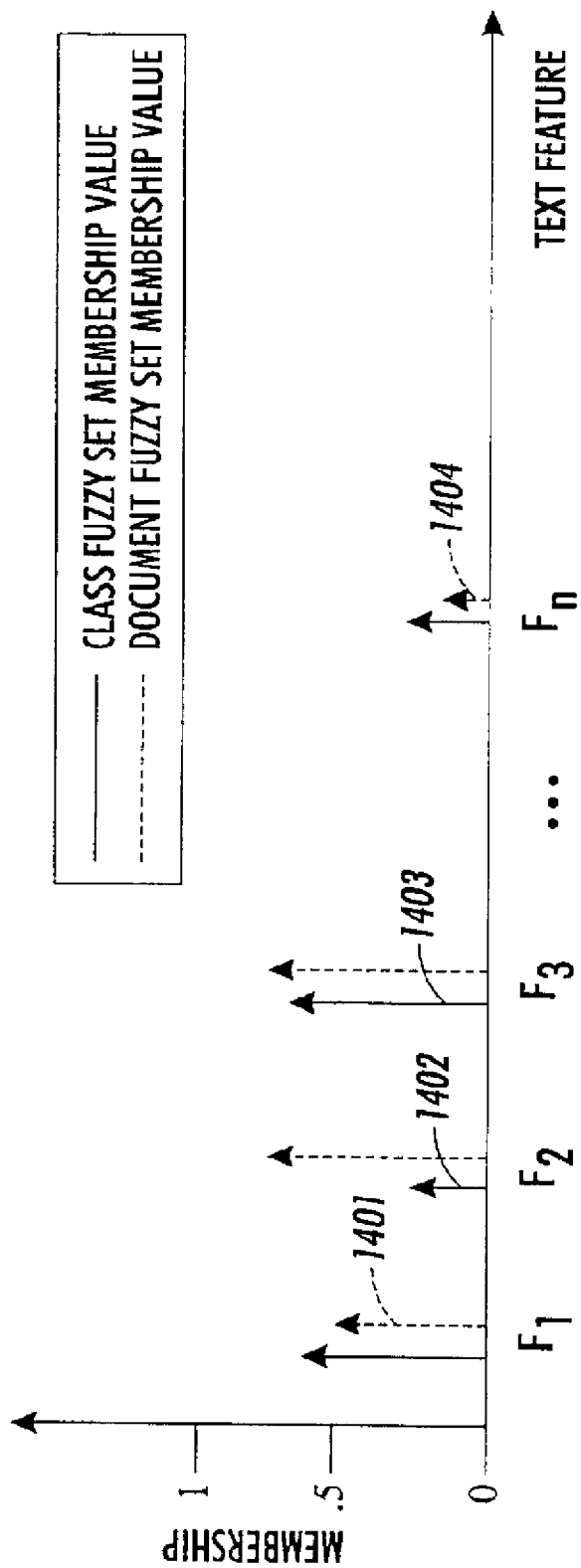
FIG. 14 graphically depicts an example of max-min strategy for a class fuzzy set and a document fuzzy set.

In one embodiment, a max-min (i.e., maximum-minimum) strategy is used to calculate a degree of match between a fuzzy set for class "i", denoted as FuzzySetForClass$_i$, and an unlabelled document fuzzy set DocumentFuzzySet as follows:

$$Match_i = \text{Max}\left[\min_{f \in \{f_1 \cdot f_n\}} [\mu_{DocumentFuzzySet}(f), \mu_{ClassFuzzySet_i}(f)]\right],$$

where f is the text features (1 . . . n) in the document, $\mu_{DocumentFuzzySet}(f)$ denotes the membership value of feature f in the fuzzy set of the Document, and $\mu_{ClassFuzzySet_i}(f)$ denotes the membership value of feature f in the fuzzy set of the $Class_i$. This corresponds to the degree of membership of the unlabelled text object or Document 112 in each class $Class_i$ and is termed $Match_i$. FIG. 14 graphically depicts an example of max-min strategy for the class fuzzy set and the document fuzzy set. In the example shown, first each text feature "$f_i$" is examined and the minimum value between each class fuzzy set and the document fuzzy set are selected (e.g., 1401, 1402, 1403, 1404). Subsequently, the maximum of these minimums is selected (e.g., 1403) to represent the match (or degree of match).

In an alternate embodiment, a probabilistic matching strategy is used whereby, the degree of match between each class fuzzy set, $FuzzySetForClass_i$, and the document fuzzy set, $\{f_1/\mu_{DocumentFuzzySet}(f_1), \ldots, f_n/\mu_{DocumentFuzzySet}(f_n)\}$, is calculated as a probabilistic conditionalization (point semantic unification) as follows:

$$Pr(FuzzySetForClass_i \mid DocumentFuzzySet) = \sum_{i=1}^{n} \mu_{FuzzySetForClass_i}(f_i) \times Pr_{DocumentFuzzySet}(f_i)$$

where each text feature $f_i$ is associated with a class membership value $\mu_{FuzzySetForClass}(f_i)$ in the fuzzy set FuzzySetForClass$_i$. $Pr_{DocumentFuzzySet}(f_i)$ denotes the probability distribution obtained from the fuzzy set DocumentFuzzySet using the bijective transformation process outlined in section 4 below (or simply in this case the normalized frequency distribution as with the unlabelled document, Document). The value Pr(FuzzySetForClass$_i$|DocumentFuzzySet) represents the degree of match between the FuzzySetForClass$_i$ and the DocumentFuzzySet and is termed Match$_i$.

2.B.2 Filtering the Degree of Match

Referring again to FIG. 13, each computed degree of match is then filtered at 1304 to define an activation value for its associated class rule. These computed activation values are subsequently used to perform decision making at 1306.

More specifically, the result of each class match, Match$_i$, is passed through a class specific filter function. This act can be bypassed by setting the filter function to the identity function. The result of applying the filter function to the degree of match, Match$_i$, results in an activation value activation$_i$ for rule $r_i$. In the instance where the filter is the identity function, the activation value activation$_i$ for a rule $r_i$ is simply equated to the corresponding class match, Match$_i$. The activation value for each rule is subsequently associated with the output value Class$_i$ for each rule.

Figure 15:
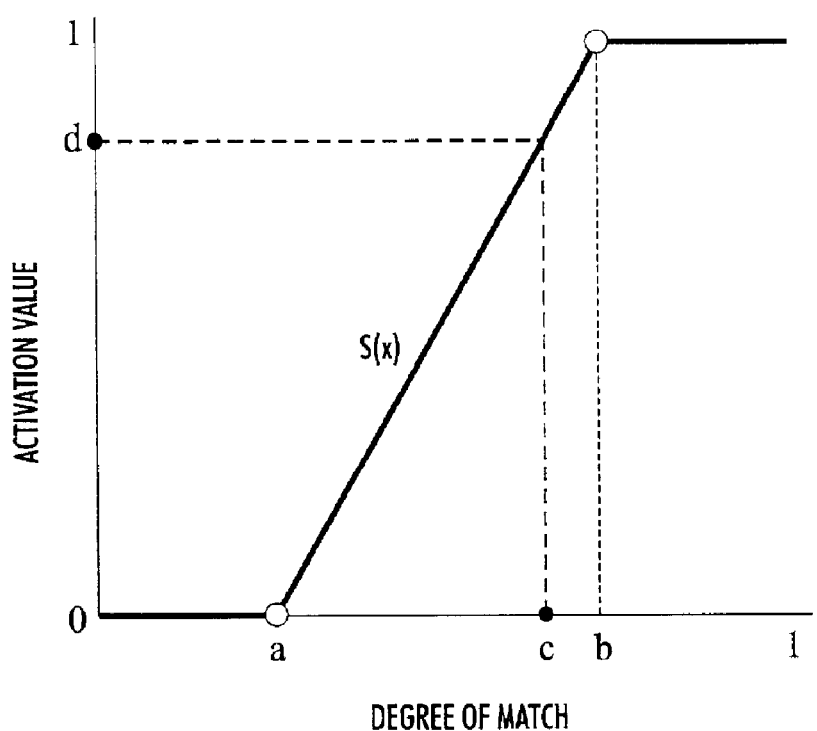
FIG. 15 graphically depicts passing a degree of match "x" through a filter function S(x) to arrive at an activation value.

Passing the degree of match "x" through the filter S(x) to arrive at an activation value is graphically depicted in FIG. 15 for an example class specific filter function S(x). As illustrated in FIG. 15, the degree of match "x" at "c" is passed through filter function S(x) to define a corresponding activation value "d".

2.B.3 Decision Making

Referring again to FIG. 13, decision-making takes place during which a class label is selected and assigned to the unlabelled document (or text object 112) at 1306, thereby classifying or categorizing the unlabeled text object. More specifically at 1306, an unlabeled text object 112 is classified by assigning to it the class label of each class rule that satisfies a selected decision making rule.

In one embodiment, the selected decision making rule selects the class label of the output value Class$_{Max}$ associated with the highest filtered activation value identified at 1304. In this embodiment at 1306, the unlabelled text object or document, Document, is classified using the label associated with the class, Class$_{Max}$.

In another embodiment, the unlabelled document is classified using a predefined number of labels. In one instance, "n" labels associated with the "n" highest filtered activation values at 1304 are assigned to the unlabeled text object 112 at 1306.

In yet another embodiment, a threshold value T is chosen, such that any label associated with a filtered activation value at 1304 that is greater than the threshold value T is assigned to the unlabeled text object 112 at 1306.

2.C Knowledge Base Learning

Figure 16:
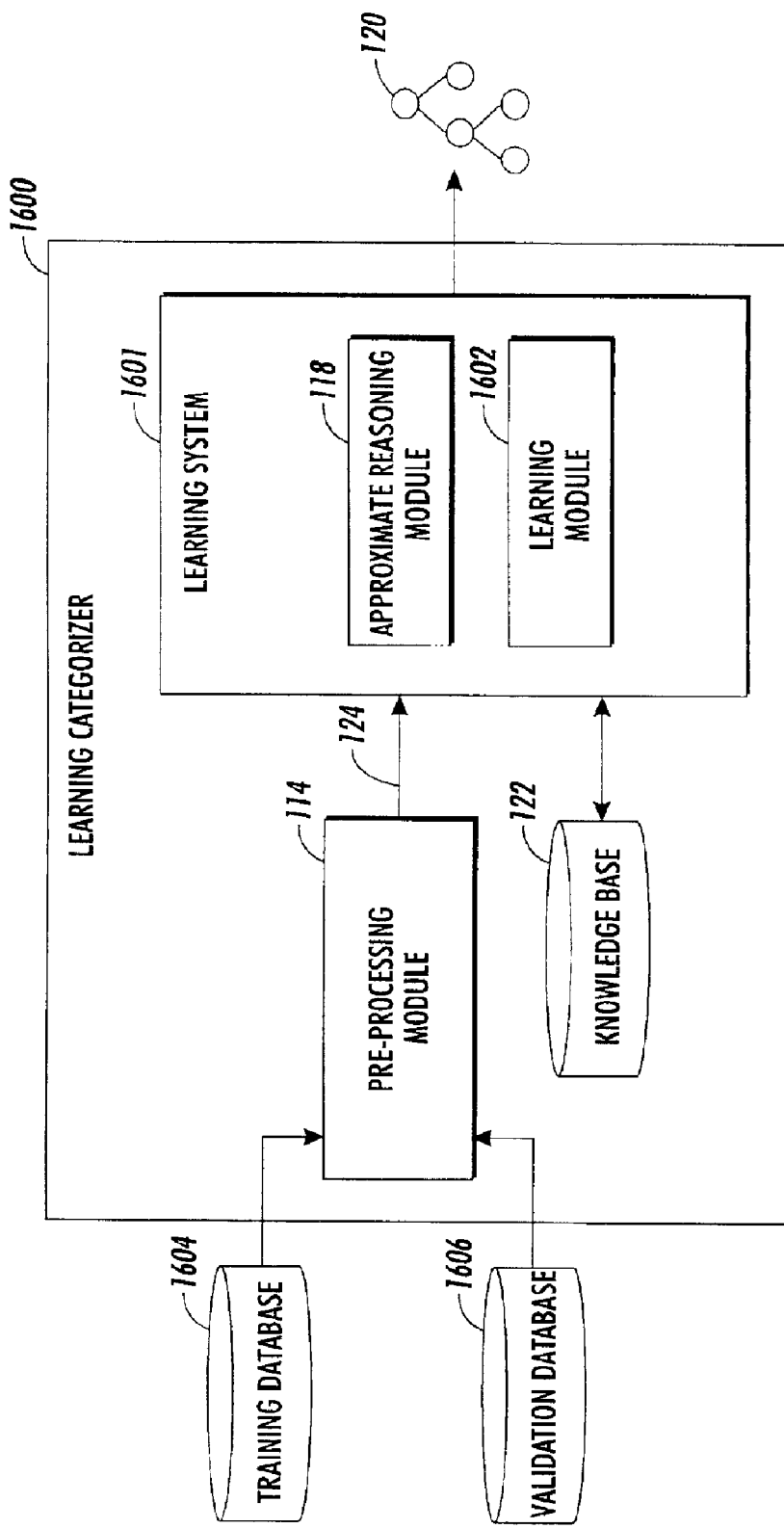
FIG. 16 illustrates an alternate embodiment in which a categorizer includes a learning system.

FIG. 16 illustrates an alternate embodiment in which a categorizer 1600 includes a learning system 1601. The learning system 1601 uses a learning module 1602 to construct the knowledge base 122 of the fuzzy text classifier 110 shown in FIG. 1.

In the embodiment shown in FIG. 3, acts 300 are performed to estimate class rules (i.e., class fuzzy sets and class filters) from a training database or corpus 1604 "Train" (i.e., a labeled collection of documents) for each possible document classification Class. The accuracy of the results can be tested against documents in a validation database 1606.

More formally, a training database 1604 "Train" is a collection of labeled documents consisting of tuples <D$_i$, L$_i$> where D$_i$ denotes the document and L$_i$ denotes the class label associated with D$_i$. Training consists of the following actions: feature extraction (as described above), feature reduction (as described above), and class rule estimation (i.e., class fuzzy sets and class filters). Having extracted and reduced the features for all classes, learning of class fuzzy sets and class filters can begin. A class fuzzy set, FuzzySetForClass$_i$, can be denoted as follows:

$$FuzzySetForClass_i = \sum_{j=1}^{n} f_j / \mu_{FuzzySetForClass_i}(f_j),$$

where each text feature $f_j$ is associated with a class membership value $\mu_{FuzzySetForClass_i}(f_j)$.

Figure 17:
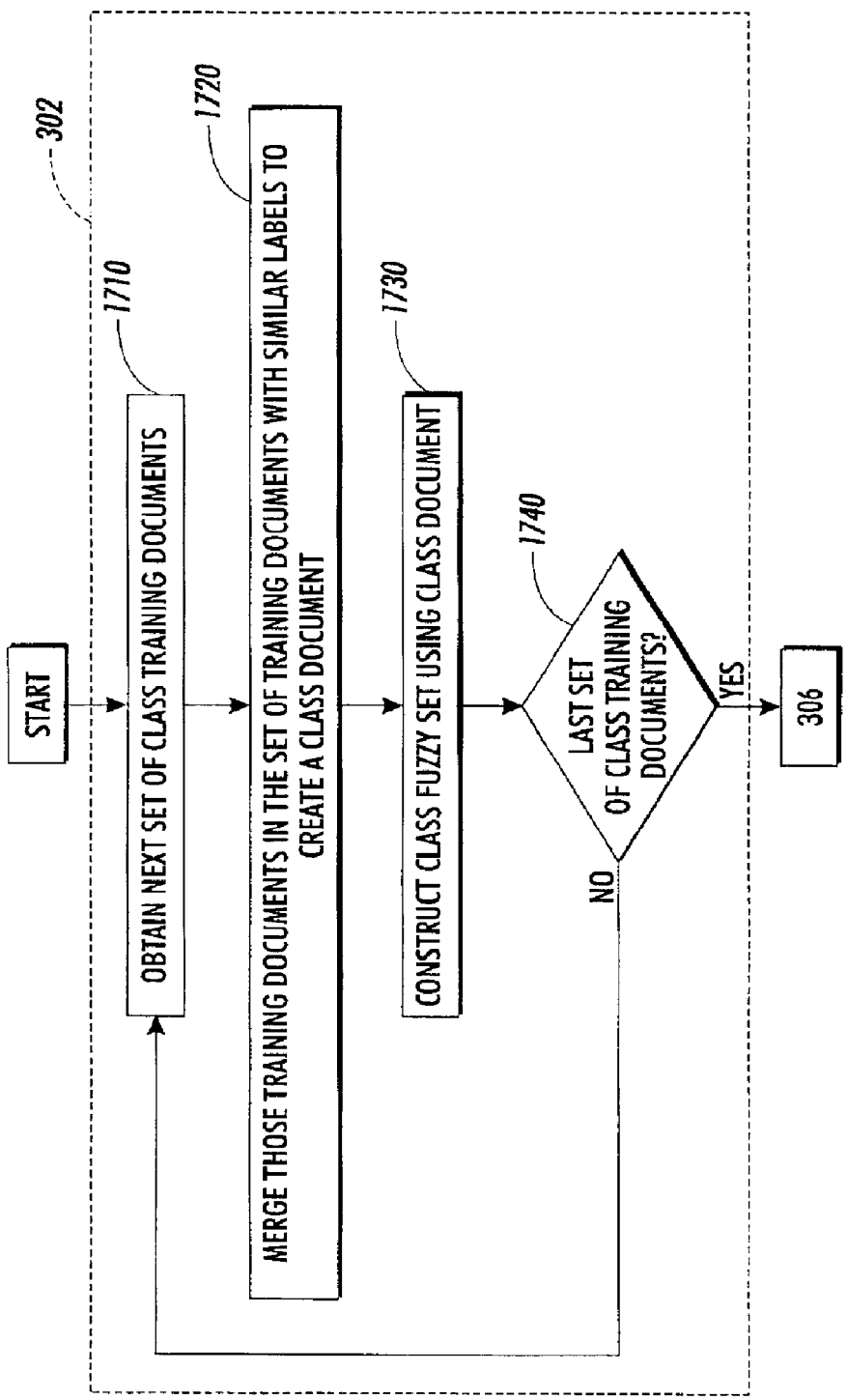
FIG. 17 illustrates a detailed flow diagram for constructing a class document fuzzy set at 302 in FIG. 3.

As illustrated in the flow diagram in FIG. 17, the construction of a class document fuzzy set, FuzzySetForClass$_i$, for Class$_i$ involves merging, at 1720, all documents defined in a set of training documents for a class obtained, at 1710, that have a label Class$_i$ (e.g., tuples that have a label L=Class$_i$). Subsequently, acts similar to those performed for constructing a document fuzzy set in FIG. 4 are performed at 1730 to construct a class fuzzy set using the merged class document. Finally, if the last set of class training documents has been processed at 1740, then the routine terminates; otherwise, it continues at 1710.

More specifically, the acts in FIG. 4 that are also performed at 1730 for the merged class document involve: performing feature extraction on the merged class document (at 402); filtering the extracted features to reduce the feature set if necessary (at 404); identifying the frequency of occurrence of each remaining feature (at 406); and generating a normalized frequency vector for this class, class$_i$ (at 408). This normalized frequency distribution is subsequently converted into the class document fuzzy set, FuzzySetForClass$_i$, using the bijective transformation process outlined in section 4 (at 410).

2.C.1 Filter Identification

Figure 18:
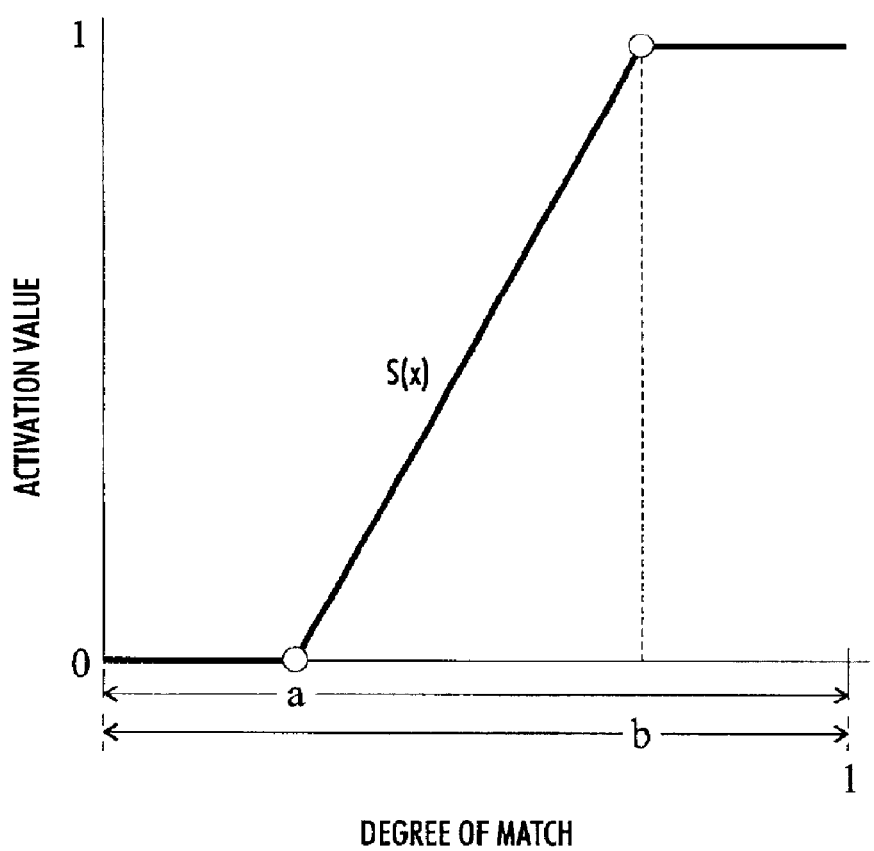
FIG. 18 illustrates an example of a learned class rule filter.

Having identified the class fuzzy sets, estimation of the class rule filters can be carried out. This section describes one method for determining the class filter function from the data. Assuming the class rule filter takes the following functional form:

$$S(x):[0,1] \to [0,1],$$

then the class rule filter structure in this embodiment is limited to a piece-wise linear function with two degrees of freedom and is canonically defined as follows and as shown in FIG. 18:

$$S(x) = \begin{cases} 0 & x \ge a \\ \frac{x-a}{b-a} & a < x < b, \\ 1 & \text{otherwise} \end{cases}$$

where the function $S(x)$ is constrained such that $0 \le a \le b \le 1$. More generally, two or more degrees of freedom could be used.

In an alternate embodiment, the structure of each class filter could be left free and the filter structure and parameters could be determined automatically. For example, a parametric monotonic function such as a sigmoid could be used as a filter. The default filter can be represented as the true fuzzy set, that is, the identity function $S(x)=x$. The number of degrees of freedom in a filter is restricted to two in order to increase the transparency of the model and also to reduce computational complexity in determining the filter. Alternatively, the structure of a filter function can be achieved using a genetic algorithm (or any other gradient-free optimization technique), where the length of the chromosome could be variable.

In one embodiment, a method determines a filter with two degrees of freedom for each class rule. Each filter is viewed as piecewise linear function with two degrees of freedom that ultimately determine the shape of the filter function. This is depicted in parameterized class filter shown in FIG. 18. Varying a and b yields a large and flexible range of filters while maintaining filter transparency. In the example shown in FIG. 18, a and b are subject to the following constraints:

$$0 \le a \le b \le 1.$$

The determination of class filters can be formulated as an optimization problem where the goal is to determine the set of class filters for that model. Any of a number of optimization techniques can be used to determine the filter structures. Since the filter functions are piecewise linear in nature, thereby producing discontinuities, the optimization techniques need to be derivative free. Consequently, a direction-set approach based upon Powell's minimization algorithm is used. Powell's minimization algorithm is disclosed by Powell, "An efficient method for finding the minimum of a function of several variables without calculating derivatives", Comput. J., Vol. 7, 1964, pp. 155–162 (hereinafter referred to as "Powell's minimization algorithm"), which is incorporated herein by reference.

2.C.1a Powell's Minimization Algorithm

More specifically, Powell's minimization algorithm is an iterative approach that carries out function minimizations along favorable directions $u_i$ in N-dimensional space. The technique involves minimizing the set of directions $u_i$, for i $\in [1, N]$. It begins by randomly initializing each direction $u_i$, subject to constraints if they should exist and then repeating the following steps (a)–(e) until the function stops decreasing: (a) save starting position as $P_o$; (b) for i $\in [1, N]$ move $P_{i-1}$ to the minimum along direction $u_i$ (using, for example, a golden section search) and call this point $P_i$; (c) for i $\in [1, N-1]$ set $u_i$ to $u_{i-1}$; (d) set $u_N$ to $P_N - P_0$; and (e) move $P_N$ to the minimum along direction $u_N$ and call this point $P_0$.

Using Powell's minimization algorithm, the minimization problem for determining class filters is defined as follows: each filter degree of freedom ($a_i$ and $b_i$ filter points) is viewed as a variable (directions $u_i$) in the range [0, 1] that satisfies the following constraint:

$$0 \le a_i \le b_i \le 1.$$

The initial filters are set to the identity filter. Then a constrained Powell's direction set minimization is carried out for p iterations (empirical evidence suggests a range of [1, 10]) or until the function stops decreasing. Each iteration involves N (where N=C*2, where C is the number of text classes and 2 corresponds to the two degrees of freedom that each class filter possesses) direction sets (corresponding to number of filter variables), where the initial directions are set to the unit directions. In order to evaluate the cost function for a set of filters the corresponding fuzzy text classifier is constructed and evaluated on the validation database 1606 (e.g., a subset of the training database set that is not used for training). Following Powell minimization algorithm, the values associated with each of the variables, whose corresponding model yielded the lowest error on the validation, are taken as the result of the optimization and are used to generate the respective class rule filters.

Finally, a class fuzzy set knowledge base 122 (shown in FIG. 16) is generated at 306 (shown in FIG. 3) using the learned class fuzzy sets at 302 and class filters 304.

3. Granule Feature Based Models

Figure 19:
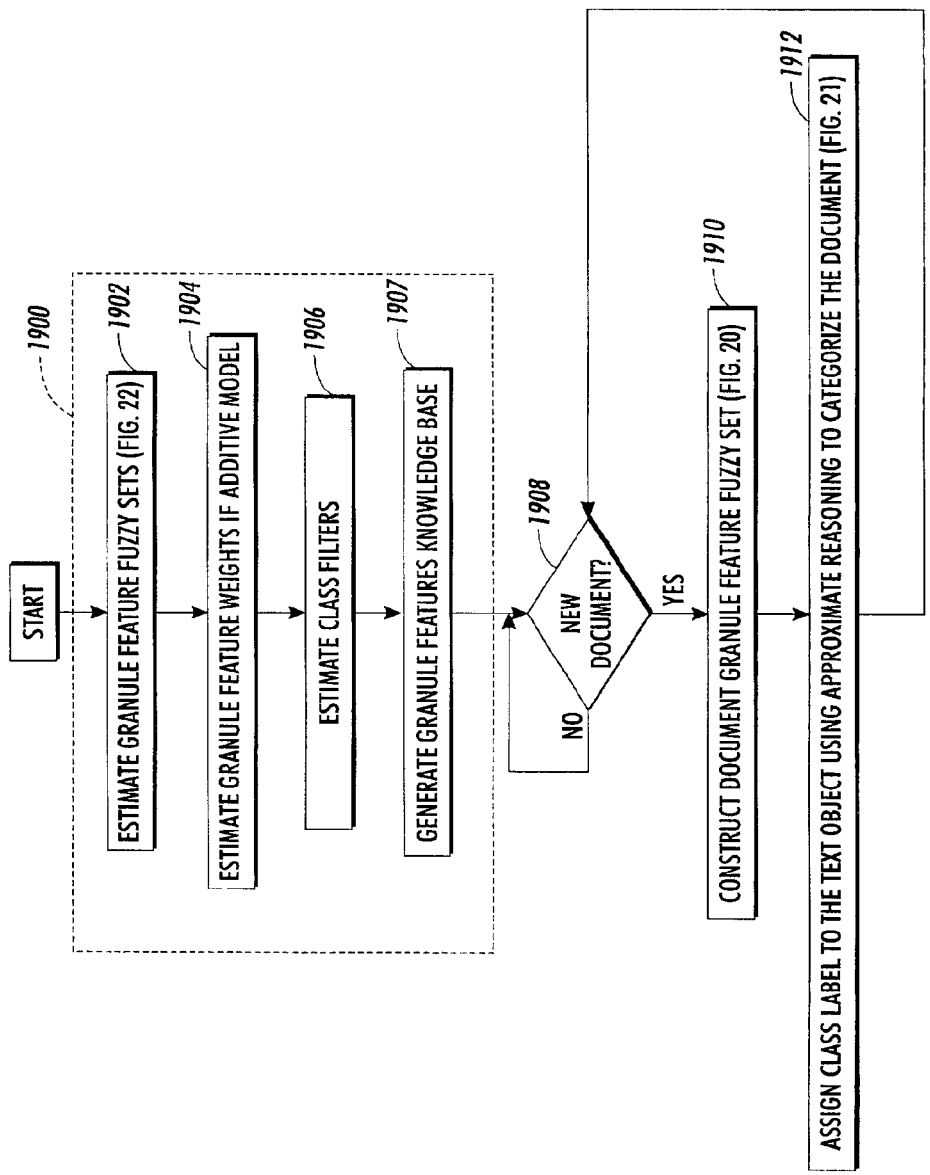
FIG. 19 is a general flow diagram of another embodiment for categorizing an unlabeled text object with a categorizer that uses a granule feature model.

This section sets forth a second embodiment of the categorizer 110 or 1600 shown in FIGS. 1 and 16. FIG. 19 depicts a flow diagram of the processes performed by a categorizer that uses a granule feature model instead of the class fuzzy model described above. Similar to a categorizer described above using fuzzy set models, a categorizer using granule feature based models performs a functional mapping from the set of features (e.g., text features), $\{f_1, \ldots, f_n\}$, to a set of class values $\{c_1, \ldots, c_c\}$.

Generally, a granule feature text categorizer consists of one class rule for each class $c_i$ and has the following knowledge base forms:

$r_1$: IF filter$_1$ (
DocumentFuzzySet$_{f1}$ is FuzzySetForClass$_{1-f1}$ $w_{1-f1}$

. . .

DocumentFuzzySet$_{fn}$ is FuzzySetForClass$_{1-fn}$ $s_{1-fn}$
) THEN Classification is Class$_1$

. . .

$r_c$: IF filter$_c$ (
DocumentFuzzySet$_{f1}$ is FuzzySetForClass$_{c-f1}$ $w_{c-f1}$

. . .

DocumentFuzzySet$_{fn}$ is FuzzySetForClass$_{c-fn}$ $w_{c-f1}$
) THEN Classification is Class$_c$.

In this embodiment, each class Class$_i$ is represented by a corresponding rule $r_i$ that consists of n weighted conditions, (e.g., one for each text feature) and a class filter. In this case, each feature is a granule feature, where each of the feature values DocumentFuzzySet$_{fj}$ and FuzzySetForClass$_{i-fj}$ are granule fuzzy sets of the form $\{w_1/\mu$ DocumentFuzzySet$_{fj}$($w_1$), . . . , $w_n/\mu$ DocumentFuzzySet$_{fj}$($w_m$)$\}$ and $\{w_1/$ $\mu_{FuzzySetForClassii-fj}(w_1), \ldots, w_n/\mu_{FuzzySetForclassii-fj}(w_m)\}$ respectively, the details of which are discussed below. The weight associated with each feature can be intuitively regarded as indicating the importance of that feature in the definition of a class.

Referring again to FIG. 19, if the embodiment is similar to that shown in FIG. 16, the knowledge base 122 for the granule feature based model is learned at 1900; otherwise, the embodiment is similar to that shown in FIG. 1 where the knowledge base is predefined, not requiring actions 1900 to be performed. The details of learning at 1900 are discussed below in section 3.C.

At 1908, a new document is accepted by the categorizer. For each new document received by the categorizer, document granule feature fuzzy sets are developed at 1910 and class labels are assigned to text objects using approximate reasoning to categorize the document at 1912, the details of which are discussed below in sections 3.A and 3.B.

3.A Constructing Document Feature Fuzzy Sets

Figure 20:
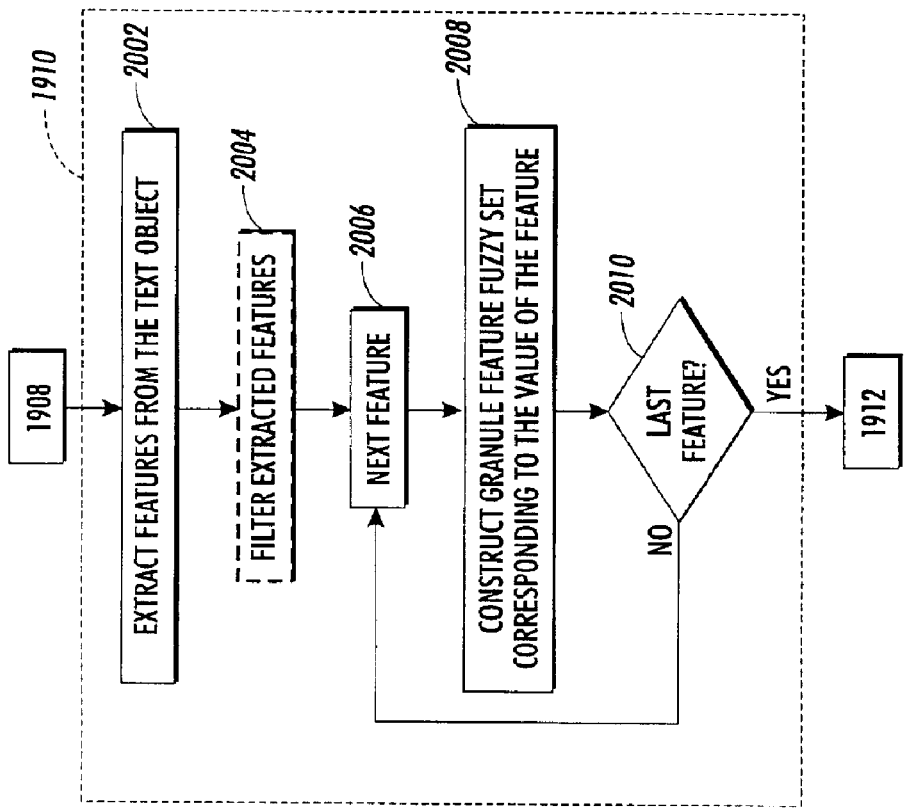
FIG. 20 depicts a flow diagram for constructing a document feature fuzzy set for a granule feature based model as set forth at 1910 in FIG. 19.

FIG. 20 depicts a flow diagram for constructing a document feature fuzzy set for a granule feature based model as set forth at 1910 in FIG. 19. The document's features are extracted at 2002 and filtered (if necessary) at 2004. At 2006, a next feature is identified in the features remaining after being filtered at 2004. Subsequently at 2008, a granule feature fuzzy set is constructed that corresponds to the value of the identified feature as described above in section 2.A.1.c. This process terminates once the last feature is processed at 2010, thereby defining the document feature fuzzy set to include each of the granule feature fuzzy sets constructed at 2008.

3.B Approximate Reasoning Using Granule Feature Based Models

Figure 21:
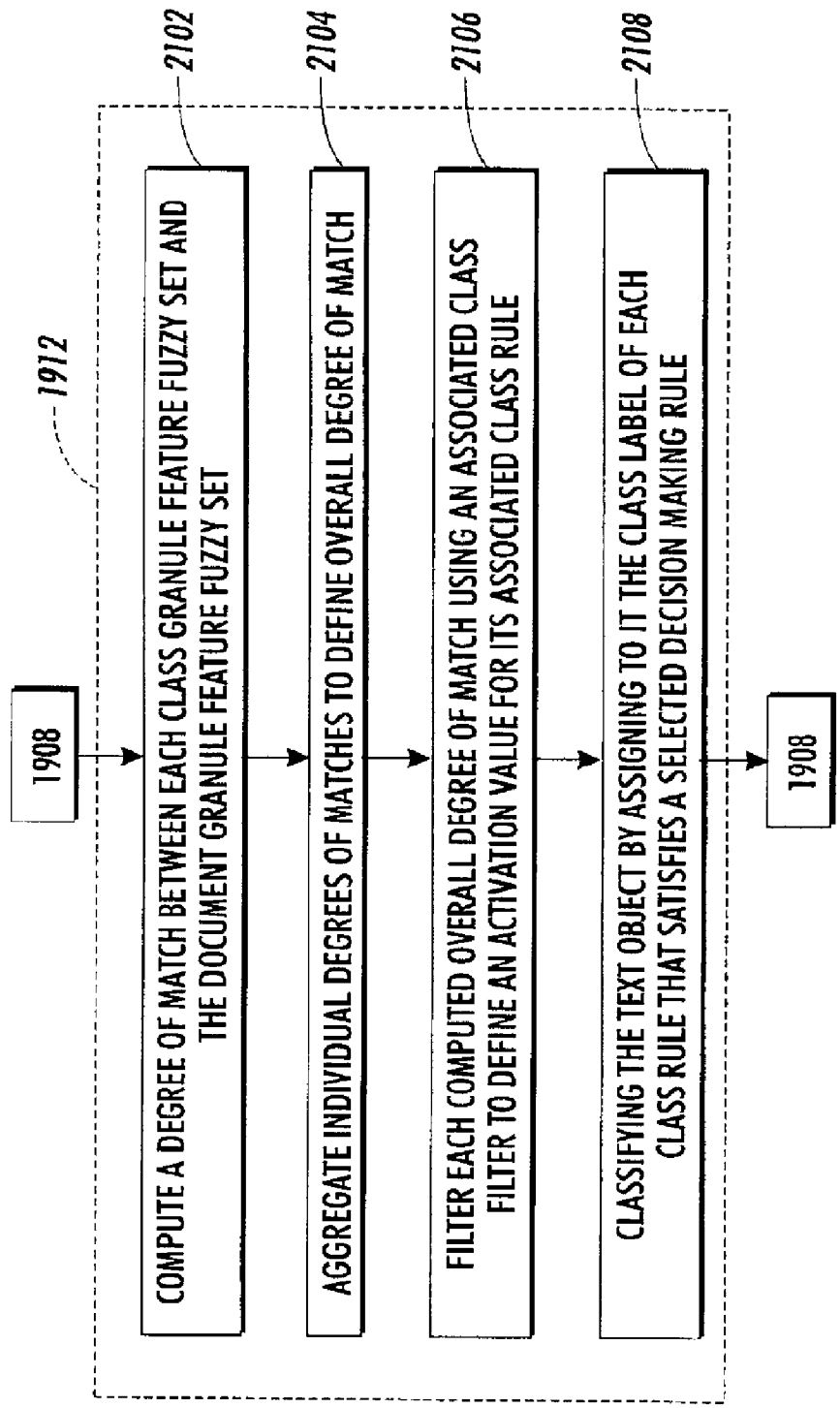
FIG. 21 depicts a flow diagram that details the act 1912 shown in FIG. 19 for assigning a class label to a text object using approximate reasoning.

FIG. 21 depicts a flow diagram that details the act 1912 in FIG. 19 for assigning a class label to a text object using approximate reasoning to categorize the document. At 2102, the degree of match is computed between each class granule feature fuzzy set, $FuzzySetForClassi_{i-fj}$, and the document granule feature fuzzy set, $DocumentFuzzySet_{fj}$ using any of the matching strategies outlined above in section 2.A.1. This leads to a degree of match $match_{i-fj}$ for each granule feature $f_j$ in each rule $r_i$.

Subsequently at 2104, individual degrees of matches are aggregated to define an overall degree of match using either an additive model or a product model.

When an additive model is used to perform aggregation at 2104, the overall degree of match is set equal to the weighted sum of the degrees of match. More specifically in this embodiment, for each rule $r_i$ a weighted combination of the constituent feature matches, $match_{i-fj}$, is taken as follows yielding an overall degree of match for rule $r_i$ of $match_i$:

$$match_i = \sum_{j=1}^{n} match_{i-fj} w_{i-fj}.$$

When a product model is used to perform aggregation at 2104 the overall degree of match is set equal to the product of the degrees of match. More specifically in this embodiment, the overall degree of match $match_i$ for rule $r_i$ is calculated by taking the product of the constituent feature matches, $match_{i-fj}$, as follows:

$$match_i = \prod_{j=1}^{n} match_{i-fj}.$$

At 2106, the computed match, $match_i$, for each rule $r_i$ is then passed through a corresponding filter function $filter_i$ resulting in an activation value for the rule $activation_i$. The activation value for each rule that satisfies a selected decision making rule at 2108 is subsequently associated with the output value $Class_i$ (i.e., class label) for each rule.

At 2108, decision-making takes place in which a class label is selected to assign to the unlabelled document (or text object). More specifically at 2108, a text object is classifed by assigning to it the class label of each class rule that satisfies a selected decision making rule.

In one embodiment, the decision making rule reduces to selecting a class label of the output value $Class_{Max}$ associated with the highest activation value. That is, in this embodiment the unlabelled document, Document, is classified using the label associated with $Class_{Max}$.

In another embodiment, the unlabelled document is classified using a decision making rule that specifies a predefined number of labels. In one instance of this embodiment, the "n" labels associated with the "n" high activation values are assigned to the unlabeled text object.

In yet another embodiment, a threshold value T could be chosen, such that any label associated with an activation value greater than the threshold value T is assigned to the unlabeled text object.

3.C Learning Granule Feature Based Models

Referring again to FIG. 19, which presents at 1900 a process for the construction of a granule feature text classifier. At 1902, a granule fuzzy set is estimated for each granule feature from a training database or corpus 1604 Train (i.e., a labeled collection of documents) for each possible document classification Class. At 1904, granule feature weights are estimated in the case where the granule features are aggregated as a weighted function (i.e., for additive models only). At 1906, class filters are estimated. Finally at 1907, a granule feature knowledge base is generated using the granule feature fuzzy sets estimated at 1902, the granule feature weights (if additive model) estimated at 1904, and the class filters estimated at 1906.

Figure 22:
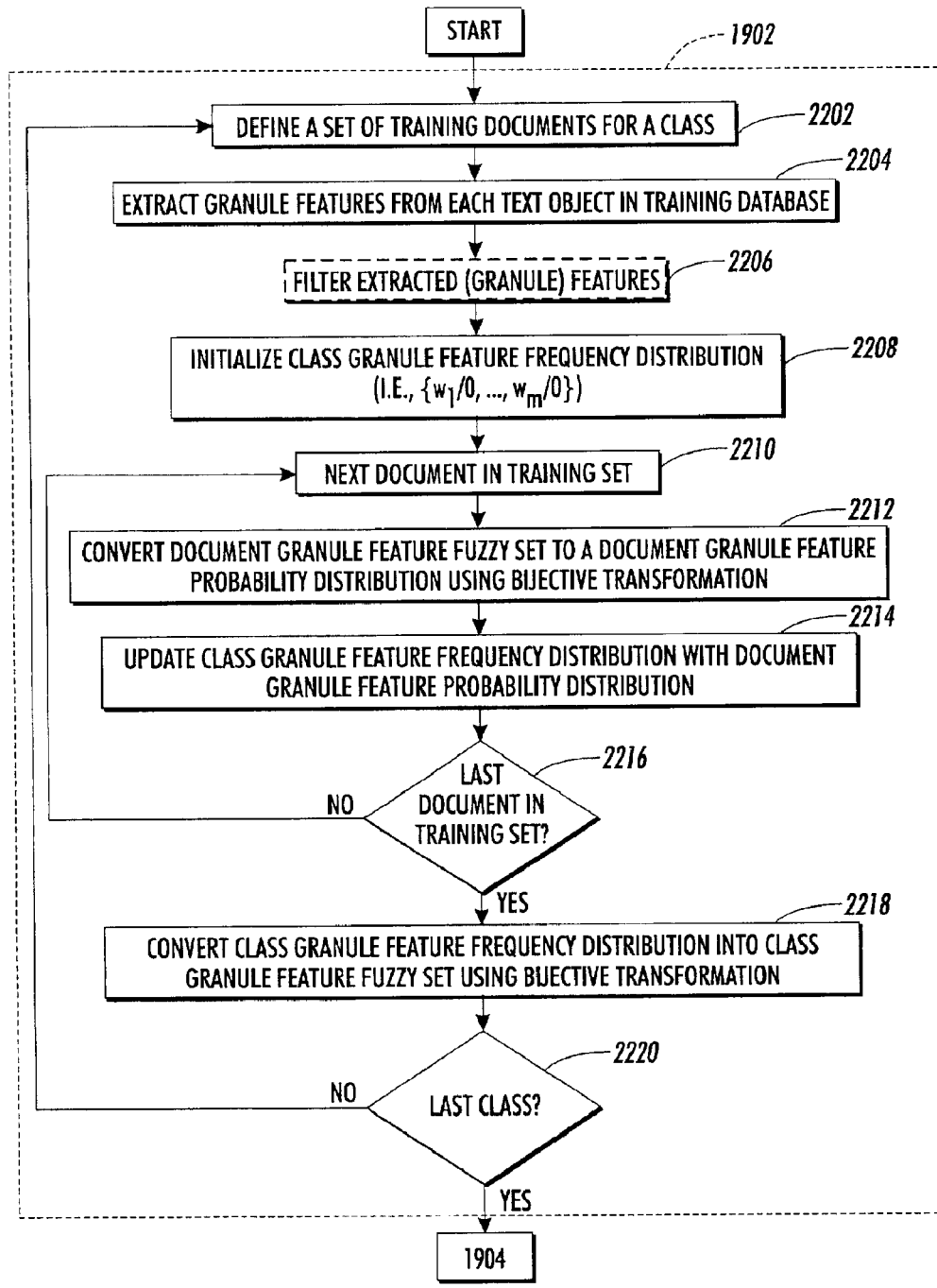
FIG. 22 depicts a flow diagram for a process that is used to estimate each granule fuzzy set at 1902 shown in FIG. 19.

FIG. 22 depicts a flow diagram for a process that is used to estimate each granule fuzzy set at 1902 shown in FIG. 19. Initially a training set is defined for documents in a class at 2202. More formally, a training database Train is a collection of labeled documents consisting of tuples <$D_i$, $C_i$>, where $D_i$ denotes the document and $L_i$ denotes the class label associated with $D_i$.

At 2204, granule feature fuzzy sets are extracted from each text object $D_i$ resulting in a feature vector $\{f_{i-1}, \ldots, f_{i-n}\}$, where each $f_{i-j}$ is a granule fuzzy set value of the $j^{th}$ feature of training example i. At 2206, the extracted granule features are filtered, if necessary, to limit the number of features in the feature vector.

In this case, the granule feature fuzzy set has the following form: $\{w_{j-1}/\mu_{wj-1}(f_j), \ldots, w_{j-m}/\mu_{wj-m}(f_j)\}$ where $w_{j-1}, \ldots, w_{j-m}$ represents a linguistic partition of the feature $f_j$ and $\mu_{wj-p}(f_j)$ represents the membership of the word $w_{j-p}$ in the granule fuzzy which in this case corresponds to the membership of normalized frequency value for feature $f_j$ in the fuzzy set denoted by $w_{j-p}$.

For simplification of presentation but not loss of generality, each feature vector is assumed to consist of just one feature f. As a result of this simplification, each document $D_i$ is now represented in terms of one granule fuzzy set of the form $\{w_1/\mu_{w1}(f), \ldots, w_m/\mu_{wm}(f)\}$ where $w_1, \ldots, w_m$ represents a linguistic partition of the feature f and $\mu_{wp}(f)$ represents the membership of the frequency value for feature f in the granule denoted by the fuzzy set $w_p$.

Learning a granule feature representation of classes consists of a number of steps that are subsequently presented and graphically depicted in FIG. 22. At 2208, for each class label $Class_k$, a granule frequency distribution is then initialized; i.e., $\{w_{k-1}/0, \ldots, w_{k-m}/0\}$. At 2210, a next document in the training set is examined with class label $Class_k$.

In the case of each training example $D_i$, each feature frequency value (normalized or otherwise), in this instance limited to one feature f, is linguistically reinterpreted using the granules that partitions the frequency universe of f is generated; i.e., a granule feature fuzzy set (and described here using one granule feature fuzzy set) $<\{w_1/\mu_{w1}(f), \ldots, w_m/\mu_{wm}(f)\}, C_k>$. The resulting granule feature fuzzy set $\{w_1/\mu_{w1}(f), \ldots, w_m/\mu_{wm}(f)\}$ is then converted into a probability distribution on granules $\{w_1|Pr_{wm}(f), \ldots, w_m/Pr_{wm}(f)\}$ using the bijective transformation outlined in section 4, at 2212.

At 2214, each training example $<\{w_1/Pr_{wm}(f), \ldots, w_m/Pr_{wm}(f)\}, C_k>$ is processed as follows: the granule frequency distribution $\{w_1/freq_k(w_1), \ldots, w_m/freq_k(w_m)\}$ associated with the class $C_k$ is updated with $\{w_1/Pr_{wm}(f), \ldots, w_m/Pr_{wm}(f)\}$; i.e., the class granule frequency $freq_k(w_p)$ associated with each granule $w_p$ is updated as follows: $freq_k(w_p)=freq_k(w_p)+Pr_{wp}(f)$.

Once all training examples have been processed at 2216, the class granule frequency distributions $\{w_1/Pr_{Ck}(w_1), \ldots, w_m/Pr_{Ck}(w_m)\}$ is converted, at 2218, into granule fuzzy sets using the bijective transformation outlined in section 4. At 2220, if an additional granule feature fuzzy set is to be learned then act 2202 is repeated; otherwise, the process terminates.

3.C.1 Estimating the Granule Feature Weights with Additive Model

In one embodiment, the weights associated with each granule feature can be determined using semantic discrimination analysis. Semantic discrimination analysis measures the degree of mutual dissimilarity of classes, represented by fuzzy sets defined over the same feature universe. This similarity measure is based on point semantic unification. The semantic discriminating power of a granule feature $f_i$ for a class Class (i.e., $Discrim\_f_{i-class}$) is calculated as follows:

$$Discrim\_f_{i-class} = 1 - \underset{\substack{j=1 \\ j \neq k}}{\overset{c}{Max}} Pr(FS_k \mid FS_j),$$

where $$Pr(FS_k \mid FS_j) = \sum_{i=1}^{n} \mu_{FS_K}(x_i) \times Pr_{FS_j}(x_i)$$

denotes the semantic match between fuzzy sets. This yields a vector of discrimination values (consisting of one discrimination value for each feature) for each rule. The weight associated with each granule feature $f_i$ is obtained by normalizing each value such that the resulting weights for a rule sum to one. This is achieved as follows for:

$$w_{iClass} = \frac{Discrim\_F_{iClass}}{\sum_{j=1}^{n} Discrim\_F_{jClass}},$$

where n corresponds to the number of features in the class rule (this can vary from class to class, see section 3.B.2 for details). This result can be further optimized by eliminating features with a learn weight value $W_{iClass}$ that is less than a threshold weight T. Alternatively this result can be further optimized by selecting only the highest n weighted features for a class.

3.C.2 Feature Weights Identification Using Powell's Minimization Algorithm

In alternative embodiment, the determination of feature weights can be formulated as an optimization problem where the goal is to determine the set of weights that model the aggregation behavior of a problem effectively. Any of a number of optimization techniques can be used to determine the weights.

In one embodiment, a direction-set method approach based upon Powell's minimization algorithm is selected. Any other optimization technique could equally have been used. For example, the weights could be encoded in a chromosome structure and a genetic search carried out to determine near optimum weights as described by Holland in "Adaptation in Natural and Artificial Systems", University of Michigan Press: Ann Arbor, 1975. The cost or fitness function is based on the model error as determined on a validation database. The error measure of recall and precision, or a combination of these measures, such as F1, can be used. More details relating to error measures (i.e., information retrieval measures) are described by Manning and Schutze in "Foundations Of Statistical Natural Language Processing", published in 1999, MIT Press, Cambridge, Mass.

The weights identification problem is encoded as follows: each class rule weight $w_i$ is viewed as a variable that satisfies the following constraint:

$0 \leq w_i \leq 1$.

The approach begins with estimating the weights by measuring the semantic separation of the inter class fuzzy sets using semantic discrimination analysis (see section 3.C.1). Then a constrained Powell's direction set minimization, as described above, is carried out for p iterations or until the function stops decreasing.

Each iteration involves N direction sets (where $N=R*W_i$, and R corresponds to the number of rules in the knowledge base and $W_i$ denotes the number of feature weights in the body of rule $R_i$), where the initial directions are set to the unit directions. Note in this case it is assumed that each class rule has equal numbers of weights W, however, this can vary for each class.

In order to evaluate the cost function for a set of weights, the corresponding additive Cartesian granule feature model is constructed. The class rule weights are set to the normalized Powell variable values (i.e., the constituent weights for a class rule are normalized so that the weights for a rule sum to one).

The constructed model is then evaluated on the validation database. In this case, the class filters are set to the identity function. Following Powell minimization, the weight values, whose corresponding model yielded the lowest error, are taken to be the result of the optimization.

Rule filters can subsequently be estimated using similar procedures as described in section 2.C.1. Subsequently, a granule feature knowledge base is generated.

4. Converting a Probability Distribution to a Fuzzy Set

This section describes a method for converting a probability distribution to a fuzzy set using the bijective transformation. More specifically, this section describes a transformation from a normalized frequency probability distribution Pr to a corresponding fuzzy set f for a discrete variable. A more detailed presentation of this transformation is described in Soft Computing by Shanahan.

Let the fuzzy set f and the frequency probability distribution Pr be defined over the frame of discernment $\Omega_W = \{w_1, \ldots, w_n\}$ with supports equal to $\Omega_X$ and let P(X) be the power set of $\Omega_W$. To simplify the presentation, it is assumed that no two probabilities in Pr are equal and that the prior probability distributions on fuzzy portion labels is uniform. This bijective transformation process is summarized by the following five steps:

First, order the normalized frequency probability distribution Pr such that:

$$Pr(w_i) \geq Pr(w_j) \text{ if } i > j \; \forall \; i, j \in \{1, \ldots, n\}.$$

Second, since this bidirectional transformation is order preserving, the fuzzy set f can assume the following form:

$$\mu_f(w_i) \geq \mu_f(w_j) \text{ if } i < j \; \forall \; i, j \in \{1, \ldots, n\}.$$

Third, this fuzzy set f induces a possibility distribution $\pi_f$, which in turn induces a mass assignment of the form:

$$<\{w_1, \ldots, w_n\} : \pi_f(w_n),$$

$$\ldots,$$

$$\{w_1, \ldots, w_k\} : \pi_f(w_k) - \pi_f(w_{k+1}),$$

$$\ldots,$$

$$\{w_1\} : \pi_f(w_1) - \pi_f(w_2)>.$$

Fourth, letting $A_i = \{w_1, \ldots, w_i\} \; \forall \; i \in \{1, \ldots, n\}$ and since $MA_f(A) = \pi_f(w_i) - \pi_f(w_{i+1})$, the following equation can be defined:

$$Pr'(w_i) = \sum_{A \in P(X), w_i \in A} MA_f(A) \frac{Pr(w_i)}{\sum_{z \in B} Pr(z)},$$

which can be simplified to:

$$Pr'(w_i) = \sum_{k=i}^{n} \pi_f(w_i) - \pi_f(w_{i+1})(\{w_1, \ldots, w_k\}) \frac{1}{i}.$$

Fifth, for i=n then:

$$Pr'(w_n) = \pi_f(\{w_n\})/n,$$

such that:

$$\pi_f(\{w_n\}) = n Pr'(w_n).$$

The remaining values for $\pi_f(\{w_i\})$ (i.e., $i \in \{1, \ldots, n-1\}$) can be solved for by direct substitution of $\pi_f(\{w_{i+1}\})$. This leads to the following general equation for obtaining a possibility $\pi_f(\{w_i\})$ corresponding the probability $Pr(\{w_i\})$:

$$\pi_f(w_i) = iPr'(w_i) + \sum_{k=i+1}^{n} Pr'(w_k) \forall \; i \in \{1, \ldots, n\}.$$

The preceding five steps results in a possibility distribution $\pi_f$ and a corresponding fuzzy set f.

By way of example, consider the following frequency distribution on the words Small, Medium and Large:

Large: 0.6333+Medium: 0.333+Small: 0.0333.

This probability distribution corresponds to the fuzzy set such that a prior probability was conditioned on this fuzzy set, that is Pr(X/f) resulting in the above probability distribution. Assuming the prior distribution is uniform, it leads to the following fuzzy set:

f={Large: 1+Medium:0.7+Small:0.1} where $\mu_{f(w_i)}$ is calculated through its associated possibility as shown in Table 1 (in which "*" denotes product).

TABLE 1

| Word Membership | Membership Value |
| --- | --- |
| $\mu_f$(Large) = $\pi_f$(Large) | = 1*0.6333 + (0.333 + 0.0333) = 1 |
| $\mu_f$(Medium) = $\pi_f$(Medium) | = 2*0.333 + (0.0333) = 0.7 |
| $\mu_f$(Small) = $\pi_f$(Small) | = 3*0.0333 = 0.1 |

5. Miscellaneous

It will be appreciated by those skilled in the art that the categorizers described herein can be embodied using software components and hardware components that operate on computer systems such as: a personal computer, a workstation, a mobile/cellular phone, a handheld device etc.

The hardware components include a Central Processing Unit (i.e., CPU), Random Access Memory (RAM), Read Only Memory (ROM), User Input/Output ("I/O"), and network I/O. The User I/O may be coupled to various input and output devices, such as a keyboard, a cursor control device (e.g., pointing stick, mouse, etc.), a display, a floppy disk, a disk drive, an image capture device (e.g., scanner, camera), etc.

RAM is used by CPU as a memory buffer to store data. The display is an output device that displays data provided by CPU or other components in a computer system. In one embodiment, display is a raster device. Alternately, the display may be a CRTs or LCD. Furthermore, user I/O may be coupled to a floppy disk and/or a hard disk drive to store data. Other storage devices such as nonvolatile memory (e.g., flash memory), PC-data cards, or the like, can also be used to store data used by computer system. The network I/O provides a communications gateway to a network such as a LAN, WAN, or the Internet. The network I/O is used to send and receive data over a network connected to one or more computer systems or peripheral devices.

The software components include operating system software, application program(s), and any number of elements of the categorizers. It should be noted that not all software components are required for all the described embodiments. The operating system software may represent an MS-DOS, the Macintosh OS, OS/2, WINDOWS®, WINDOWS® NT, Unix operating systems, Palm operating system, or other known operating systems. Application Program(s) may represent one or more application programs such as word processing programs, spreadsheet programs, presentation programs, auto-completion programs, editors for graphics and other types of multimedia to such as images, video, audio etc.

The categorizer 110 may be implemented by any one of a plurality of configurations. For example, the processor may in alternative embodiments, be defined by a collection of microprocessors configured for multiprocessing. In yet other embodiments, the functions provided by software components may be distributed across multiple computing devices (such as computers and peripheral devices) acting together as a single processing unit. Furthermore, one or more aspects of software components may be implemented in hardware, rather than software. For other alternative embodiments, the computer system may be implemented by data processing devices other than a general-purpose computer.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or sub-combination thereof, which embody the invention as set forth in the claims.

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for classifying a text object, comprising:

extracting a set of features from the text object; the set of features having a plurality of features;

constructing a document class fuzzy set with a plurality of ones of the set of features extracted from the text object; each of the ones of the features extracted from the text object having a degree of membership in the document class fuzzy set and a plurality of class fuzzy sets of a knowledge base;

measuring a degree of match between each of the plurality of class fuzzy sets and the document class fuzzy set; and using the measured degree of match to assign the text object a label that satisfies a selected decision making rule;

wherein the document class fuzzy set is computed by:

calculating a frequency of occurrence for each feature in the set of features in the text object;

normalizing the frequency of occurrence of each feature in the set of features; and transforming the normalized frequency of occurrence of each feature in the set of features to define the document class fuzzy set.

2. The method according to claim 1, further comprising learning each class fuzzy set in the knowledge base.

3. The method according to claim 2, wherein each class fuzzy set is learned by:

obtaining a set of class training documents;

merging those training documents in the set of training documents with similar labels to create a class document; and computing a class fuzzy set using the class document.

4. The method according to claim 1, wherein the set of features is extracted from the text object by:

tokenizing the document to generate a word list;

parsing the word list to generate the set of grammar based features; and filtering the set of grammar based features to reduce the number of features in the set of grammar based features to define the ones of the set of features extracted from the text object used to construct the document class fuzzy set.

5. The method according to claim 1, wherein the document fuzzy set is computed by: filtering the set of features to reduce the number of features in the set of features to define the ones of the set of features extracted from the text object used to construct the document class fuzzy set.

6. The method according to claim 1, wherein the normalized frequency of occurrence of each feature in the set of features is transformed using a bijective transformation.

7. The method according to claim 1, wherein the degree of match between each of the plurality of class fuzzy sets and the document class fuzzy set is measured using one of a maximum-minimum strategy and a probabilistic reasoning strategy based upon semantic unification.

8. The method according to claim 1, further comprising:

filtering each degree of match with an associated class specific filter function to define an activation value for its associated class rule;

identifying the activation value of the class rule with the highest activation value; each class rule having an associated class label; and assigning the class label of the class rule with the highest identified activation value to classify the text object into one of the plurality of class fuzzy sets.

9. The method according to claim 8, further comprising learning each associated class specific filter function.

10. The method according to claim 1, wherein the decision making rule is used to identify one of a maximum value, a threshold value, and a predefined number.

11. A method for classifying a text object, comprising:

extracting a set of granule features from the text object; each granule feature being represented by a plurality of fuzzy sets and associated labels;

constructing a document granule feature fuzzy set using a plurality of ones of the granule features extracted from the text object; each of the ones of the granule features extracted from the text object having a degree of membership in a corresponding granule feature fuzzy set of the document granule feature fuzzy set and a plurality of class granule feature fuzzy sets of a knowledge base;

computing a degree of match between each of the plurality of class granule feature fuzzy sets and the document granule feature fuzzy set to provide a degree of match for each of the ones of the granule features;

aggregating each degree of match of the ones of the granule features to define an overall degree of match for each feature; and using the overall degree of match for each feature to assign the text object a class label that satisfies a selected decision making rule.

12. The method according to claim 11, further comprising filtering the granule features extracted from the text object to define the ones of the granule features used to construct the document granule feature fuzzy set.

13. The method according to claim 12, wherein the filtering of the granule features is based upon one of Zipf's law and semantic discrimination analysis.

14. The method according to claim 11, wherein the ones of the granule features that are used to construct the document granule feature fuzzy set are reduced to one of a predefined threshold number of granule features and range of granule features.

15. The method according to claim 11, further comprising learning each granule fuzzy set in the knowledge base.

16. The method according to claim 11, wherein the degree of match between each of the plurality of class granule feature fuzzy sets and the document granule feature fuzzy set is measured using one of a maximum-minimum strategy and a probabilistic reasoning strategy based upon semantic unification.

17. The method according to claim 11, further comprising:

filtering each degree of match with an associated class specific filter function to define an activation value for its associated class rule;

identifying the activation value of the class rule with the highest activation value; each class rule having an associated class label; and assigning the class label of the class rule with the highest identified activation value to classify the text object into one of the plurality of class granule feature fuzzy sets.

18. The method according to claim 11, further comprising learning each associated class specific filter function by initializing a granule frequency distribution for each class label; and converting the granule frequency distribution for each class label into a granule fuzzy set.

19. The method according to claim 11, wherein individual degrees of matches are aggregated using one of a product and an additive model.

20. The method according to claim 11, further comprising estimating granule feature weights when they are aggregated as a weighted function using an additive model.

21. A text categorizer for classifying a text object, comprising:

a knowledge base for storing categories represented by class fuzzy sets and associated class labels;

a pre-processing module for representing a plurality of extracted features from the text object as a document class fuzzy set; and an approximate reasoning module for using a measured degree of match between the class fuzzy sets in the knowledge base and the document class fuzzy set to assign to the text object the associated class labels of those categories that satisfy a selected decision making rule;

wherein the pre-processing module further comprises a fuzzy set generator for:

calculating a frequency of occurrence for the plurality of features extracted from the text object;

normalizing the frequency of occurrence of each feature of the plurality of features extracted from the text object; and transforming the normalized frequency of occurrence of each of the plurality of features extracted from the text object to define the document class fuzzy set.

22. The text categorizer of claim 21, further comprising a learning module for learning the class fuzzy sets.

23. The text categorizer of claim 22, further comprising:

a training database for creating a plurality of class documents; and a validation database for validating learned class fuzzy sets in the knowledge base.

24. The text categorizer of claim 22, wherein the learning module learns the class fuzzy sets are learned by:

obtaining a set of class training documents;

merging those training documents in the set of training documents with similar labels to create a class document; and computing a class fuzzy set using the class document.

25. A text categorizer for classifying a text object, comprising:

a feature extractor for extracting a set of granule features from the text object; each granule feature being represented by a plurality of fuzzy sets and associated labels;

a fuzzy set generator for constructing a document granule feature fuzzy set using a plurality of ones of the granule features extracted from the text object; each of the ones of the granule features extracted from the text object having a degree of membership in a corresponding granule feature fuzzy set of the document granule feature fuzzy set and a plurality of class granule feature fuzzy sets of a knowledge base; and an approximate reasoning module for:

computing a degree of match between each of the plurality of class granule feature fuzzy sets and the document granule feature fuzzy set to provide a degree of match for each of the ones of the granule features;

aggregating each degree of match of the ones of the granule features to define an overall degree of match for each feature; and using the overall degree of match for each feature to assign the text object a class label that satisfies a selected decision making rule.

26. The text categorizer according to claim 25, further comprising a learning module for learning each associated class specific filter function by initializing a granule frequency distribution for each class label; and converting the granule frequency distribution for each class label into a granule fuzzy set.

* * * * *